US012778009B2

(12) United States Patent
Vandike et al.

(10) Patent No.: US 12,778,009 B2
(45) Date of Patent: Nov. 3, 2026

(54) PREDICTIVE RESPONSE MAP GENERATION AND CONTROL SYSTEM

(71) Applicant: Deere & Company, Moline, IL (US)

(72) Inventors: Nathan R. Vandike, Geneseo, IL (US); Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 18/977,328

(22) Filed: Dec. 11, 2024

(65) Prior Publication Data

US 2025/0098584 A1 Mar. 27, 2025

Related U.S. Application Data

(63) Continuation of application No. 17/572,901, filed on Jan. 11, 2022, now Pat. No. 12,245,549.

(51) Int. Cl.

| | |
|---|---|
| ***A01D 41/127*** | (2006.01) |
| ***B60N 2/50*** | (2006.01) |
| ***B60W 10/04*** | (2006.01) |
| ***B60W 10/22*** | (2006.01) |
| ***G01C 21/00*** | (2006.01) |

(52) U.S. Cl.

CPC ......... *A01D 41/1275* (2013.01); *B60N 2/501* (2013.01); *B60W 10/04* (2013.01); *B60W 10/22* (2013.01); *G01C 21/3826* (2020.08); *B60W 2420/403* (2013.01); *B60W 2530/10* (2013.01); *B60W 2552/35* (2020.02); *B60W 2555/20* (2020.02); *B60W 2556/40* (2020.02)

(58) Field of Classification Search

CPC ................ A01D 41/1275; B60N 2/501; G01C 21/3826; B60W 10/04; B60W 2420/403

See application file for complete search history.

(56) References Cited

U.S. PATENT DOCUMENTS

| | | | | |
|---|---|---|---|---|
| 10,801,935 | B2 * | 10/2020 | Ki | G01N 3/42 |
| 11,006,567 | B2 * | 5/2021 | Johnson | A01B 63/008 |
| 2020/0156518 | A1 * | 5/2020 | Svitak | B60N 2/505 |

* cited by examiner

*Primary Examiner* — Toya Pettiegrew

(74) *Attorney, Agent, or Firm* — Christopher J. Volkmann; KELLY, HOLT & CHRISTENSON PLLC

(57) ABSTRACT

An agricultural system includes an in-situ sensor that detects a value of a dynamic response characteristic corresponding to a first geographic location, of a plurality of different geographic locations, in a field, one or more processors, and memory storing instructions executable by the one or more processors. The instructions, when executed by the one or more processors, configure the one or more processors to: obtain an information map that includes values of an agricultural characteristic corresponding to the plurality of different geographic locations in the field, identify a predictive value of the dynamic response characteristic corresponding to a second geographic location in the field based on the value of the dynamic response characteristic corresponding to the first geographic location and a value of the agricultural characteristic corresponding to the first geographic location; and control the agricultural work machine based on the predictive value of the dynamic response characteristic.

20 Claims, 11 Drawing Sheets

PREDICTIVE RESPONSE MAP GENERATION AND CONTROL SYSTEM

CROSS-REFERENCE TO RELATED APPLICATION

The present application is a continuation of and claims priority of U.S. patent application Ser. No. 17/572,901, filed Jan. 11, 2022, the content of which is hereby incorporated by reference in its entirety.

FIELD OF THE DESCRIPTION

The present description relates to agricultural machines, forestry machines, construction machines and turf management machines.

BACKGROUND

There are a wide variety of different types of agricultural machines. Some agricultural machines include harvesters, such as combine harvesters, sugar cane harvesters, cotton harvesters, self-propelled forage harvesters, and windrowers. Some harvesters can also be fitted with different types of heads to harvest different types of crops.

The speed of an agricultural machine over the ground is often tied directly to the rate at which the agricultural machine performs its operation. Thus, in order to perform an operation quickly it may be desirable to cause the agricultural machine to move relatively swiftly. However, as the agricultural machine speed increases, the wear on various machine parts increases and the potential for vehicle dynamics to impact the efficiency of the operation increases. Additionally, in agricultural machines that require an operator to drive the machine, the comfort of the operator May be affected if the machine moves too swiftly over a rough surface. In the past, the balance between machine speed and machine wear/operator comfort was set manually by an operator in the cab. However, as agricultural machines become more complex, various vehicle dynamics and terrain conditions can change quickly in ways that are not perceptible or able to be manually addressed, which may lead to undesirable machine wear and/or operator comfort.

The discussion above is merely provided for general background information and is not intended to be used as an aid in determining the scope of the claimed subject matter.

SUMMARY

An agricultural system includes an in-situ sensor that detects a value of a dynamic response characteristic corresponding to a first geographic location, of a plurality of different geographic locations, in a field, one or more processors, and memory storing instructions executable by the one or more processors. The instructions, when executed by the one or more processors, configure the one or more processors to: obtain an information map that includes values of an agricultural characteristic corresponding to the plurality of different geographic locations in the field, identify a predictive value of the dynamic response characteristic corresponding to a second geographic location in the field based on the value of the dynamic response characteristic corresponding to the first geographic location and a value of the agricultural characteristic corresponding to the first geographic location; and control the agricultural work machine based on the predictive value of the dynamic response characteristic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

DETAILED DESCRIPTION

Figure 1:
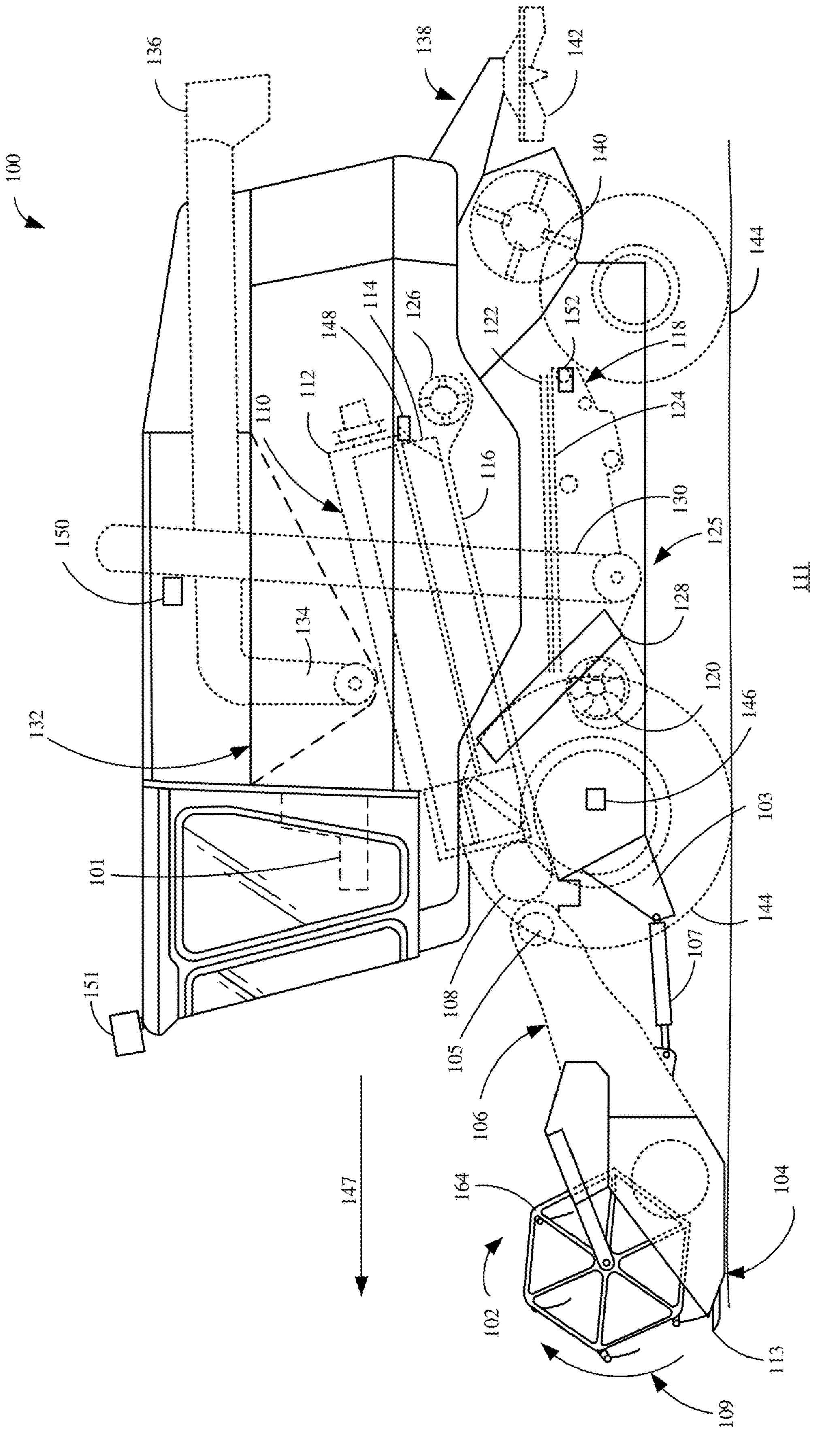
FIG. 1 is a partial pictorial, partial schematic illustration of one example of a combine harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

The present description relates to using in-situ data taken concurrently with an agricultural operation, in combination with prior data, to generate a predictive map and, more particularly, a predictive response map. In some examples, the predictive response map can be used to control an agricultural work machine, such as an agricultural harvester. While embodiments will be described with respect to a particular agricultural harvester, embodiments are applicable to a wide variety of agricultural machines.

Terrain variability and the response to a vehicle travelling over the variable terrain are complex interactions. Terrain roughness can be affected by temperature, weather conditions, previous passes of other vehicles, and soil profile roughness. Further, the dynamics of a vehicle travelling over the terrain can also be affected by a number of different variables including, without limitation, machine mass, distribution of mass, the speed of travel, damping factor of any suspension, and the direction of travel. As used herein, terrain is intended to encompass fields, roadways, or any other ground surface over which the agricultural machine may be driven or transported, Transportation of agricultural equipment is often done on roads that include less than desirable response for the operator ride comfort and vehicle/implement interactions, such as persistent bouncing and towing surges. Road characteristics includes the type of road (i.e. asphalt, cement, gravel, dirt), surface roughness, wear rate, climate, et cetera. Road characteristics can also be variable by year, and the vehicle/implement response to these can be dependent on the direction of travel, the speed of travel, and the implement/towed machine's mass or distribution of mass. In some cases, vehicle/implement response to such features can require that the vehicle be slowed down, or perhaps even stopped to eliminate the undesirable dynamics. Additionally, the terrain variability, travel velocity, machine mass and distribution of mass, soil profile roughness and/or path can influence not only the machine's dynamic response, but also the response of the operator's seat.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of agricultural machines, such as cotton harvesters, sugarcane harvesters, self-propelled forage harvesters, windrowers. Consequently, the present disclosure is intended to encompass the various types of agricultural machines described and is, thus, not limited to combine harvesters. Moreover, the present disclosure is directed to other types of work machines, such as agricultural seeders and sprayers, construction equipment, forestry equipment, and turf management equipment where generation of a predictive map may be applicable. Consequently, the present disclosure is intended to encompass these various types of harvesters and other work machines and is, thus, not limited to combine harvesters.

As shown in FIG. 1, agricultural harvester 100 illustratively includes an operator compartment with an operator seat 101 therein and a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem also includes discharge beater 126, tailings elevator 128, clean grain elevator 130, as well as unloading auger 134 and spout 136. The clean grain elevator moves clean grain into clean grain 11 tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, described in more detail below, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 104 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture mechanism 151, which may be in the form of a stereo or mono camera, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axle, or other components. In some instances, the travel speed may be sensed using a positioning system, such as a global positioning system (GPS), a dead reckoning system, a long range navigation (LORAN) system, or a wide variety of other systems or sensors that provide an indication of travel speed.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above ground 111; a residue setting sensor that is configured to sense whether agricultural harvester 100 is configured to chop the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables.

Prior to describing how agricultural harvester 100 generates a functional predictive dynamic response map, and uses the functional predictive dynamic response map for control, a brief description of some of the items on agricultural harvester 100, and their operation, will first be described. The description of FIGS. 2 and 3 describe receiving a general type of prior information map and combining information from the prior information map with a georeferenced sensor signal generated by an in-situ sensor, where the sensor signal is indicative of a characteristic in or of the field, such as characteristics of surface roughness present in the field. Characteristics of the field may include, but are not limited to, characteristics of a field such as slope, soil profile roughness, moisture, surface quality; characteristics of crop properties such as crop height, crop moisture, crop density, crop state; characteristics of grain properties such as grain moisture, grain size, grain test weight; and characteristics of machine performance such as loss levels, job quality, fuel consumption, and power utilization. A relationship between the characteristic values obtained from in-situ sensor signals and the prior information map values is identified, and that relationship is used to generate a new functional predictive map. A functional predictive map predicts values at different geographic locations in a field, and one or more of those values may be used for controlling a machine, such as one or more subsystems of an agricultural harvester. In some instances, a functional predictive map can be presented to a user, such as an operator of an agricultural work machine, which may be an agricultural harvester. A functional predictive map may be presented to a user visually, such as via a display, haptically, or audibly. The user May interact with the functional predictive map to perform editing operations and other user interface operations. In some instances, a functional predictive map can be used for one or more of controlling an agricultural work machine, such as an agricultural harvester, presentation to an operator or other user, and presentation to an operator or user for interaction by the operator or user.

Figure 2:
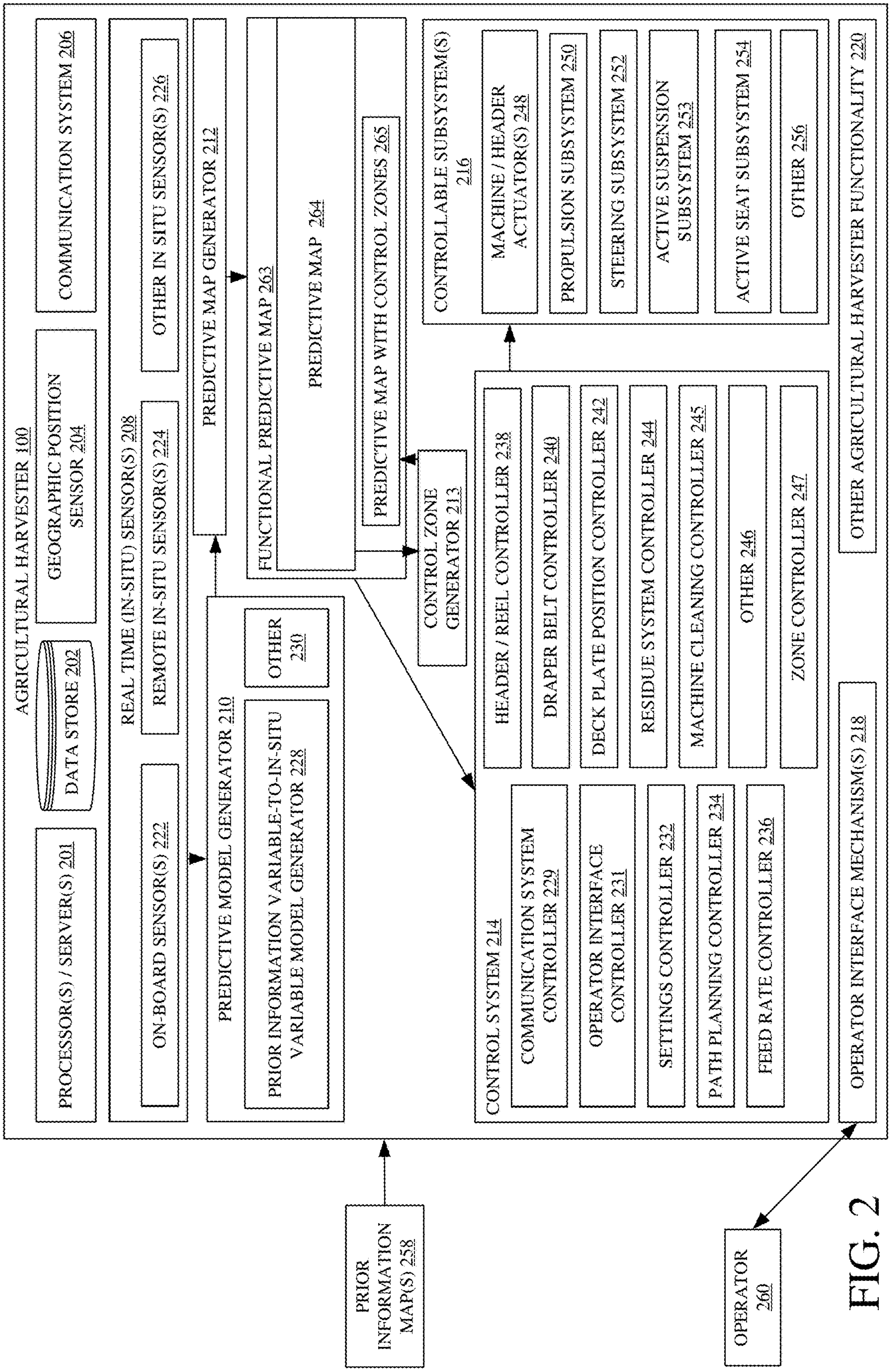
FIG. 2 is a block diagram showing some portions of an agricultural harvester in more detail, according to some examples of the present disclosure.
Figure 3A:
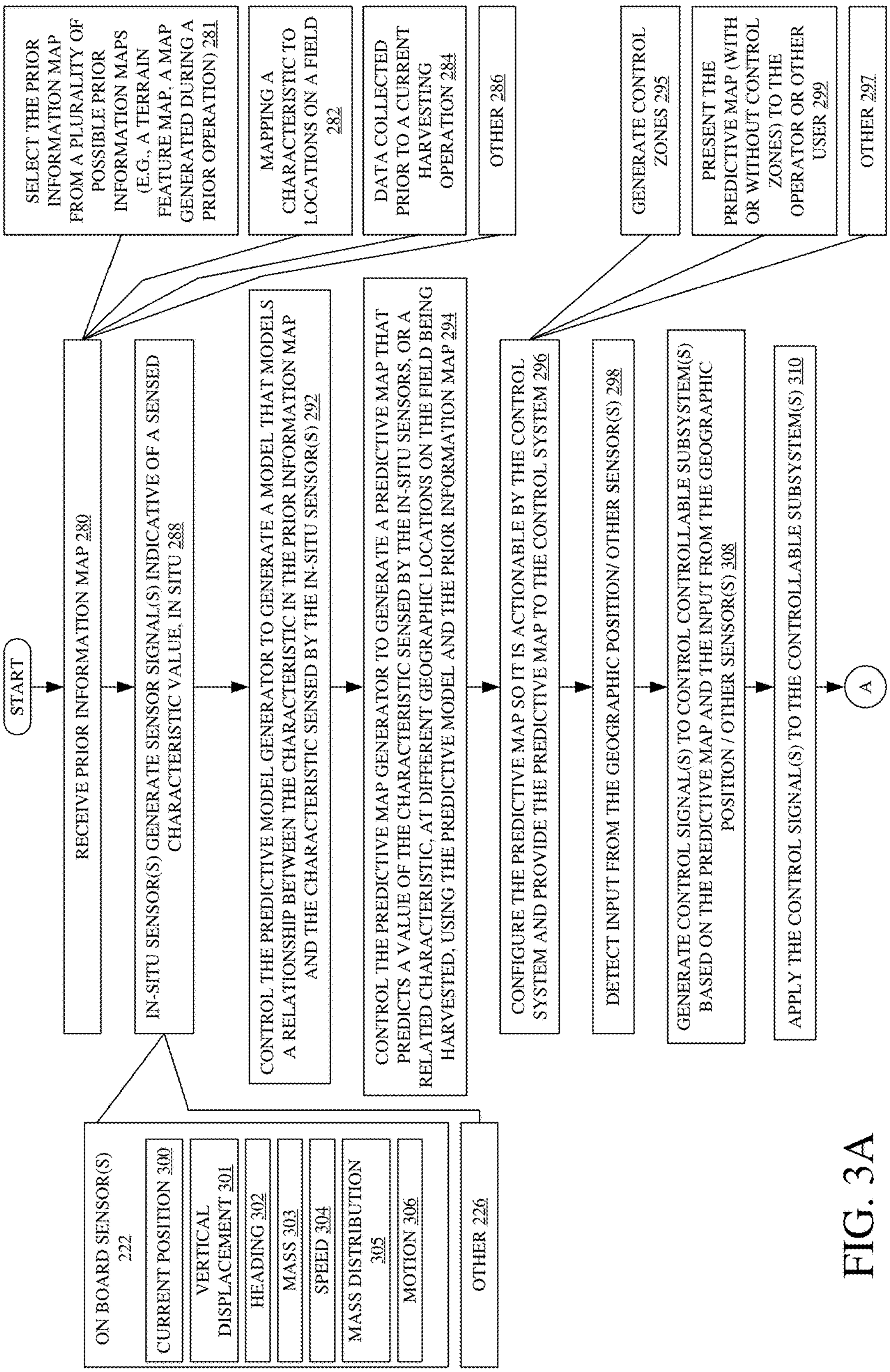
FIGS. 3A-3B (collectively referred to herein as FIG. 3) show a flow diagram illustrating an example of operation of an agricultural harvester in generating a map.
Figure 3B:
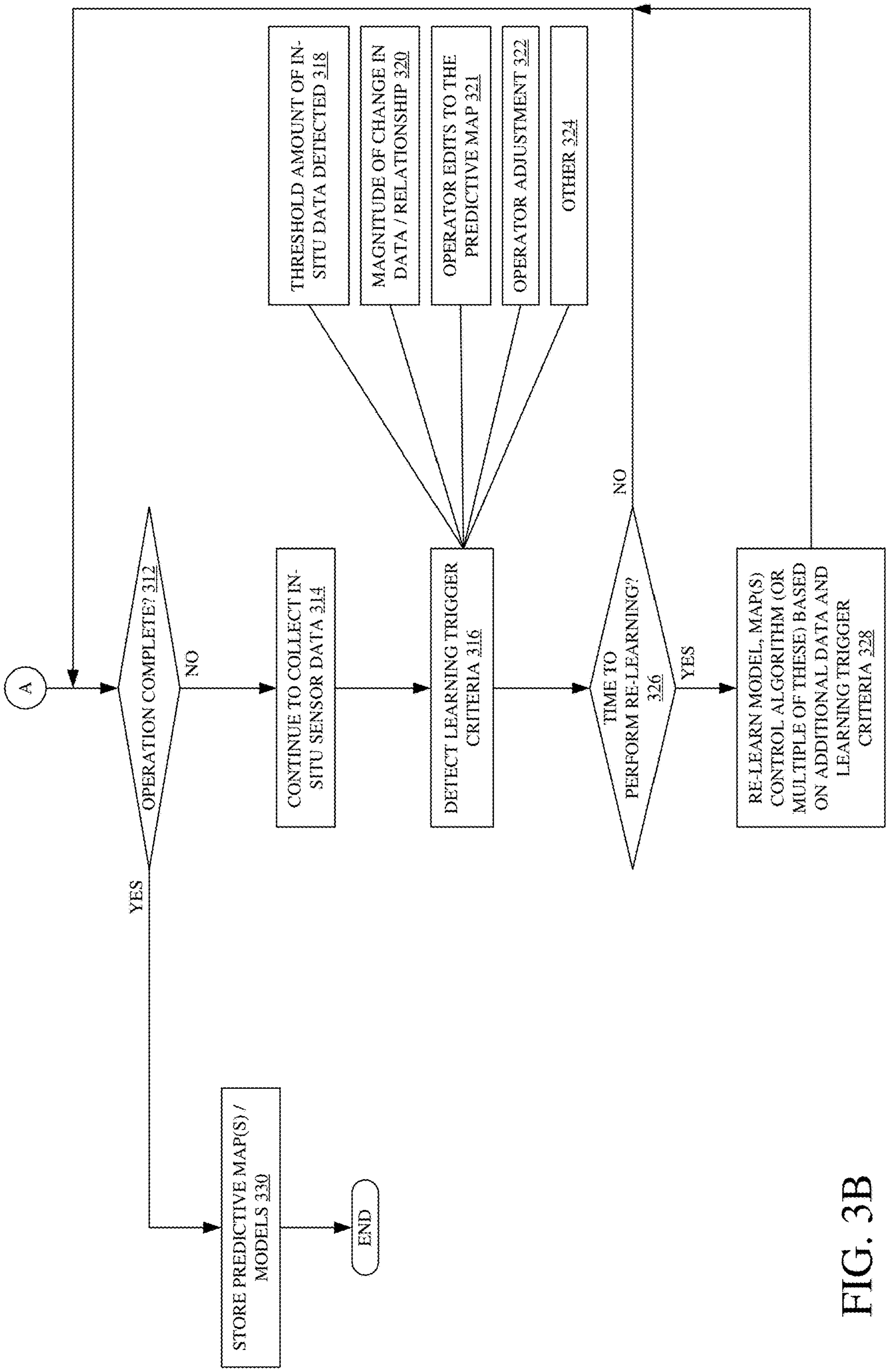
Figure 4:
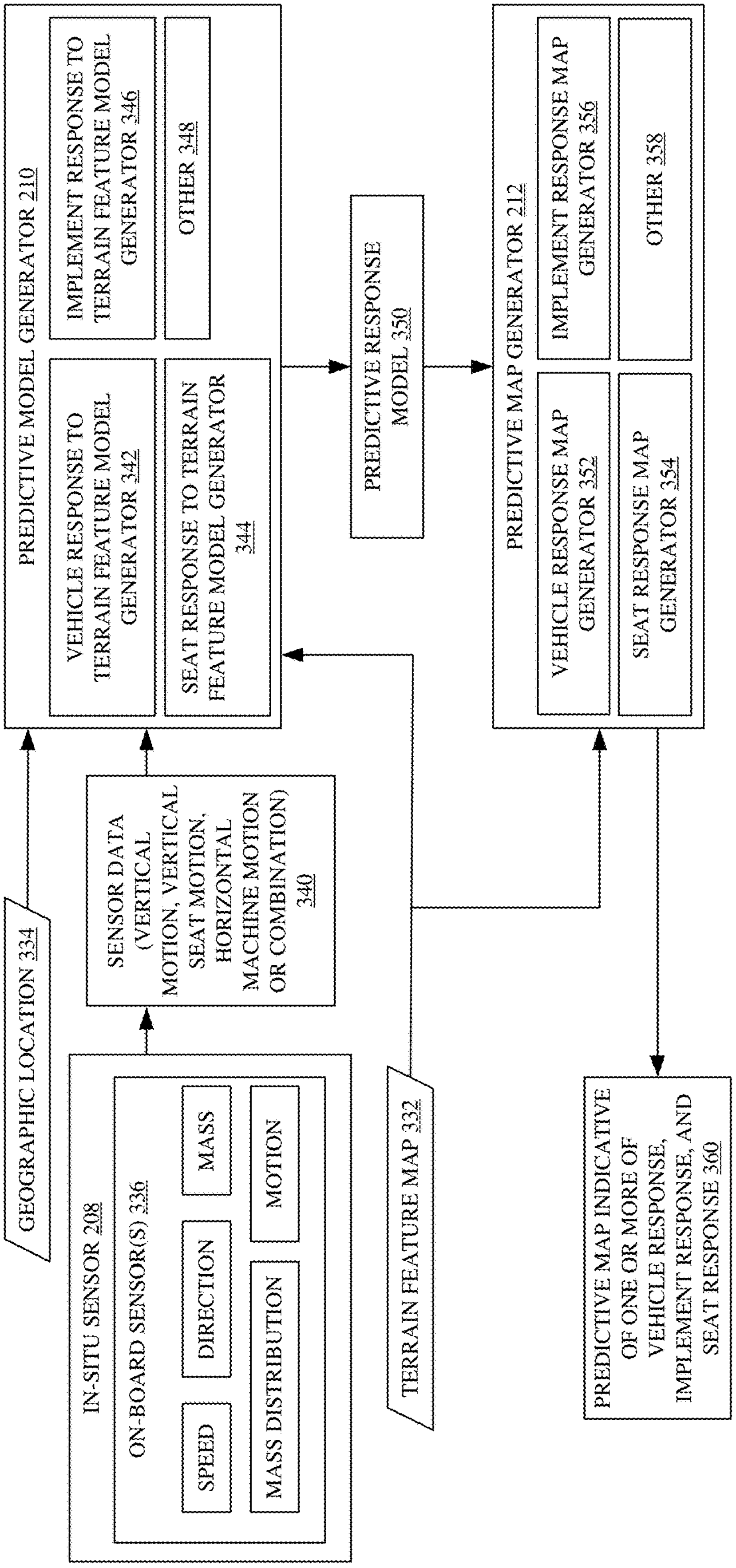
FIG. 4 is a block diagram showing one example of a predictive model generator and a predictive metric map generator.
Figure 5:
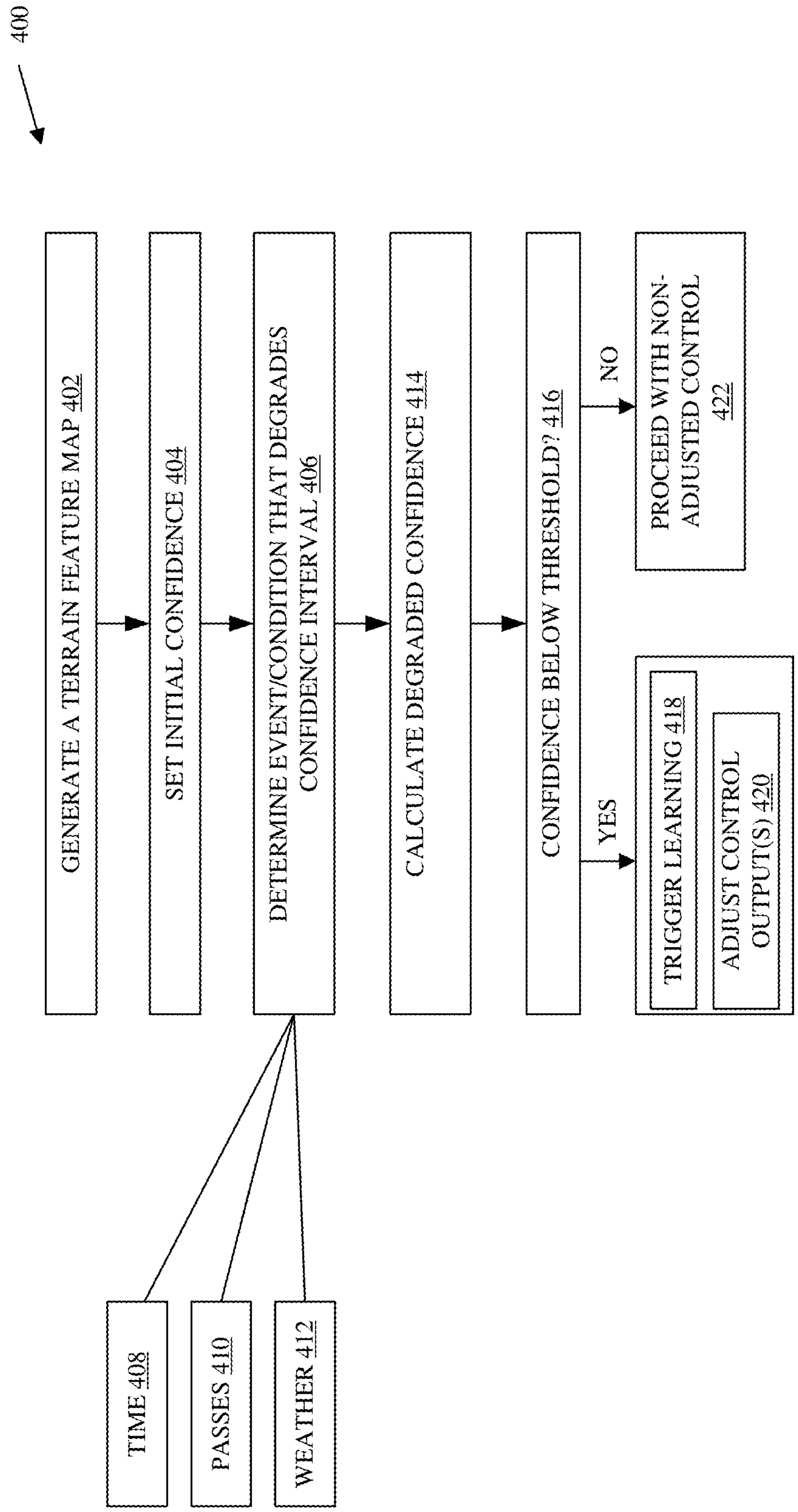
FIG. 5 is a flow diagram of a method of generating and utilizing a confidence metric relative to a predictive dynamic response model for an agricultural machine.

After the general approach is described with respect to FIGS. 2 and 3, a more specific approach for generating a functional predictive dynamic response map that can be presented to an operator or user, or used to control agricultural harvester 100, or both is described with respect to FIGS. 4 and 5. Again, while the present discussion proceeds with respect to the agricultural harvester and, particularly, a combine harvester, the scope of the present disclosure encompasses other types of agricultural harvesters or other agricultural work machines. As defined herein, an agricultural work machine is a machine used for agricultural purposes to do work. The agricultural work machine may be a tractor, a harvester, a sprayer, et cetera. Further, the agricultural work machine may tow an agricultural implement, such as a planter or sprayer.

FIG. 2 is a block diagram showing some portions of an example agricultural harvester 100. FIG. 2 shows that agricultural harvester 100 illustratively includes one or more processors or servers 201, data store 202, geographic position sensor 204, communication system 206, and one or more in-situ sensors 208 that sense one or more agricultural characteristics of a field concurrent with a harvesting operation. An agricultural characteristic can include any characteristic that can have an effect of the harvesting operation. Some examples of agricultural characteristics include characteristics of the harvesting machine, the field, the plants on the field, and the weather. Other types of agricultural characteristics are also included. The in-situ sensors generate values corresponding to the sensed characteristics. The agricultural harvester 100 also includes a predictive model or relationship generator (collectively referred to hereinafter as "predictive model generator 210"), predictive map generator 212, control zone generator 213, control system 214, one or more controllable subsystems 216, and an operator interface mechanism 218. The agricultural harvester 100 can also include a wide variety of other agricultural harvester functionality 220. The in-situ sensors 208 include, for example, on-board sensors 222, remote sensors 224, and other sensors 226 that sense characteristics of a field or machine operation during the course of an agricultural operation. Predictive model generator 210 illustratively includes a prior information variable-to-in-situ variable model generator 228, and predictive model generator 210 can include other items 230. Control system 214 includes communication system controller 229, operator interface controller 231, a settings controller 232, path planning controller 234, feed rate controller 236, header and reel controller 238, draper belt controller 240, deck plate position controller 242, residue system controller 244, machine cleaning controller 245, zone controller 247, and system 214 can include other items 246. Controllable subsystems 216 include machine and header actuators 248, propulsion subsystem 250, steering subsystem 252, active suspension subsystem 253, active seat subsystem 254, and subsystems 216 can include a wide variety of other subsystems 256.

FIG. 2 also shows that agricultural harvester 100 can receive prior information map 258. As described below, the prior information map 258 includes, for example, a topographical map or other suitable terrain map that relates geographical position with terrain conditions from a prior operation. However, prior information map 258 may also encompass other types of data that were obtained prior to a harvesting operation or a map from a prior operation. FIG. 2 also shows that an operator 260 may operate the agricultural harvester 100. The operator 260 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 260 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure.

Prior information map 258 may be downloaded onto agricultural harvester 100 and stored in data store 202, using communication system 206 or in other ways. In some examples, communication system 206 may be a cellular communication system, a system for communicating over a wide area network or a local area network, a system for communicating over a near field communication network, or a communication system configured to communicate over any of a variety of other networks or combinations of networks. Communication system 206 may also include a system that facilitates downloads or transfers of information to and from a secure digital (SD) card or a universal serial bus (USB) card or both.

Geographic position sensor 204 illustratively senses or detects the geographic position or location of agricultural harvester 100. Geographic position sensor 204 can include, but is not limited to, a global navigation satellite system (GNSS) receiver that receives signals from a GNSS satellite transmitter. Geographic position sensor 204 can also include a real-time kinematic (RTK) component that is configured to enhance the precision of position data derived from the GNSS signal. Geographic position sensor 204 can include a dead reckoning system, a cellular triangulation system, or any of a variety of other geographic position sensors.

In-situ sensors 208 may be any of the sensors described above with respect to FIG. 1. In-situ sensors 208 include on-board sensors 222 that are mounted on-board agricultural harvester 100. Such sensors may include, for instance, an inertia measurement unit (IMU), a vertical displacement sensor, and/or a perception sensor (e.g., a forward looking mono or stereo camera system and image processing system). The in-situ sensors 208 also include remote in-situ sensors 224 that capture in-situ information. In-situ data include data taken from a sensor on-board the harvester or taken by any sensor where the data are detected during the harvesting operation.

Predictive model generator 210 generates a model that is indicative of a relationship between the values sensed by the in-situ sensor 208 and a metric mapped to the field by the prior information map 258. For example, if the prior information map 258 depicts terrain, and the in-situ sensor 208 is sensing a value indicative of vertical displacement, then prior information variable-to-in-situ variable model generator 228 generates a predictive response model that models the relationship between the terrain conditions and the vertical displacement value. The predictive response model can also be generated based on terrain data from the prior information map 258 and multiple in-situ data values generated by in-situ sensors 208. Then, predictive map generator 212 uses the predictive response model generated by predictive model generator 210 to generate a functional predictive dynamic response map that predicts the response of the agricultural machine to terrain properties, such as soil roughness, sensed by the in-situ sensors 208 at different locations in the field based upon the prior information map 258.

The examples herein describe the generation of a predictive model and, in some examples, the generation of a functional predictive map based on the predictive model. The examples described herein are distinguished from other approaches by the use of a model which is at least one of multi-variate, non-linear, or site-specific (i.e., georeferenced, such as map-based). Furthermore, the model is revised as the work machine is performing an operation and while additional in-situ sensor data are collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Cluster Analysis, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make use of networks of data values such as neural networks. These are just some examples of models.

The predictive paradigm examples described herein differ from non-predictive approaches where an actuator or other machine parameter is fixed at the time the machine, system or component is designed, set once before the machine enters the worksite, is reactively adjusted manually based on operator perception, or is reactively adjusted based on a sensor value.

The functional predictive map examples described herein also differ from other map-based approaches. In some examples of these other map-based approaches, an a priori control map is used without any modification based on in-situ sensor data or else a difference determined between data from an in situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine on the work site. The continued use or end of use of the adjustment, is not dependent on the work machine being in a particular defined location or region within the worksite.

In the examples described herein, the functional predictive maps and predictive actuator control can employ obtained maps and in-situ data that are used to generate predictive models. The predictive models are then revised during operation to generate revised functional predictive maps and revised actuator control. In some examples, the actuator control is provided based on functional predictive control zone maps which are revised during operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of a change to one or more locations while not applying the change to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example in which the adjustment is applied only to particular areas of the field, consider the following. The system may determine that a detected in-situ characteristic value (e.g., detected vertical displacement value) varies from a predictive value of the characteristic (e.g., predictive vertical displacement value), such as by a threshold amount. This deviation may only be detected in areas of the field where the elevation of the worksite is above a defined level. Thus, the revision to the predictive value is only applied to other areas of the worksite having elevation above the defined level. In this simpler example, the predictive characteristic value and elevation at the point the deviation occurred and the detected characteristic value and elevation at the point the deviation crosses the threshold are used to generate a linear equation. The linear equation is used to adjust the predictive characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field, worksite, or road are obtained;

In-situ sensors generate sensor data indicative of in-situ characteristic values, such as vertical height displacement.

A predictive model generator generates one or more predictive models based on the one or more obtained maps and the in-situ sensor data, such as a predictive vertical height displacement.

A predictive map generator generates one or more functional predictive maps based on a model generated by the predictive model generator and the one or more obtained maps. For example, the predictive map generator may generate a functional predictive dynamic response map that maps dynamic response values to one or more locations on the worksite based on a predictive dynamic response model and the one or more obtained maps.

Control zones, which include machine settings values, can be incorporated into the functional predictive dynamic response map to generate a functional predictive dynamic response map with control zones.

As the mobile machine continues to operate at the worksite, additional in-situ sensor data are collected. A learning trigger criteria can be detected, such as threshold amount of additional in-situ sensor data being collected, a magnitude of change in a relationship (e.g., the in-situ characteristic values varies to a selected, e.g., threshold, degree from a predictive value of the characteristic), and operator or user makes edits to the predictive map(s) or to a control algorithm, or both, a selected (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

In some examples, the type of values in the functional predictive map 263 may be the same as the in-situ data type sensed by the in-situ sensors 208. In some instances, the type of values in the functional predictive map 263 may have different units from the data sensed by the in-situ sensors 208. In some examples, the type of values in the functional predictive map 263 may be different from the data type sensed by the in-situ sensors 208 but have a relationship to the type of data type sensed by the in-situ sensors 208. For example, in some examples, the data type 8 sensed by the in-situ sensors 208 may be indicative of the type of values in the functional predictive map 263. In some examples, the type of data in the functional predictive map 263 may be different than the data type in the prior information map 258. In some instances, the type of data in the 11 functional predictive map 263 may have different units from the data in the prior information map 258. In some examples, the type of data in the functional predictive map 263 may be different from the data type in the prior information map 258 but has a relationship to the data type in the prior information map 258. For example, in some examples, the data type in the prior information map 258 may be indicative of the type of data in the functional predictive map 263. In some examples, the type of data in the functional predictive map 263 is different than one of, or both of, the in-situ data type sensed by the in-situ sensors 208 and the data type in the prior information map 258. In some examples, the type of data in the functional predictive map 263 is the same as one of, or both of, of the in-situ data type sensed by the in-situ sensors 208 and the data type in prior information map 258. In some examples, the type of data in the functional predictive map 263 is the same as one of the in-situ data type sensed by the in-situ sensors 208 or the data type in the prior information map 258, and different than the other.

Continuing with the preceding example, in which prior information map 258 is a terrain map or soil profile roughness and in-situ sensor 208 senses a value indicative of vertical displacements, predictive map generator 212 can use values in prior information map 258, and the model generated by predictive model generator 210, to generate a functional predictive map 263 that predicts the vertical displacement at different locations in the field. Predictive map generator 212 thus outputs predictive map 264.

As shown in FIG. 2, predictive map 264 predicts the value of a sensed characteristic (sensed by in-situ sensor(s) 208), or a characteristic related to the sensed characteristic, at various locations across the field based upon a prior information value in prior information map 258 at those locations and using the predictive model. For example, if predictive model generator 210 has generated a predictive model indicative of a relationship between machine dynamic response and a vertical displacement, then, given the vertical displacement at different locations across the field, predictive map generator 212 generates a predictive map 264 that predicts the machine dynamic response to vertical displacement at different locations across the field.

Some variations in the data types that are mapped in the prior information map 258, the data types sensed by in-situ sensors 208, and the data types predicted on the predictive map 264 will now be described.

In some examples, the data type in the prior information map 258 is different from the data type sensed by in-situ sensors 208, yet the data type in the predictive map 264 is the same as the data type sensed by the in-situ sensors 208.

Also, in some examples, the data type in the prior information map 258 is different from the data type sensed by in-situ sensors 208, and the data type in the predictive map 264 is different from both the data type in the prior information map 258 and the data type sensed by the in-situ sensors 208.

In some examples, the prior information map 258 is from a prior pass through the field during a prior operation and the data type is different from the data type sensed by in-situ sensors 208, yet the data type in the predictive map 264 is the same as the data type sensed by the in-situ sensors 208.

In some examples, the prior information map 258 is from a prior pass through the field during a prior operation and the data type is the same as the data type sensed by in-situ sensors 208, and the data type in the predictive map 264 is also the same as the data type sensed by the in-situ sensors 208.

In some examples, predictive map 264 can be provided to the control zone generator 213. Control zone generator 213 groups adjacent portions of an area into one or more control zones based on data values of predictive map 264 that are associated with those adjacent portions. A control zone may include two or more contiguous portions of an area, such as a field, for which a control parameter corresponding to the control zone for controlling a controllable subsystem is constant. For example, a response time to alter a setting of controllable subsystems 216 may be inadequate to satisfactorily respond to changes in values contained in a map, such as predictive map 264. In that case, control zone generator 213 parses the map and identifies control zones that are of a defined size to accommodate the response time of the controllable subsystems 216. In another example, control zones may be sized to reduce wear from excessive actuator movement resulting from continuous adjustment. In some examples, there may be a different set of control zones for each controllable subsystem 216 or for groups of controllable subsystems 216. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator and control zone generator 213 are able to identify the location and characteristics of the two or more crops and then generate predictive map 264 and predictive map with control zones 265 accordingly.

It will also be appreciated that control zone generator 213 can cluster values to generate control zones and the control zones can be added to predictive control zone map 265, or a separate map, showing only the control zones that are generated. In some examples, the control zones may be used for controlling or calibrating agricultural harvester 100 or both. In other examples, the control zones may be presented to the operator 260 and used to control or calibrate agricultural harvester 100, and, in other examples, the control zones may be presented to the operator 260 or another user or stored for later use.

Predictive map 264 or predictive control zone map 265 or both are provided to control system 214, which generates control signals based upon the predictive map 264 or predictive control zone map 265 or both. In some examples, communication system controller 229 controls communication system 206 to communicate the predictive map 264 or predictive control zone map 265 or control signals based on the predictive map 264 or predictive control zone map 265 to other agricultural harvesters that are harvesting in the same field. In some examples, communication system controller 229 controls the communication system 206 to send the predictive map 264, predictive control zone map 265, or both to other remote systems.

Operator interface controller 231 is operable to generate control signals to control operator interface mechanisms 218. The operator interface controller 231 is also operable to present the predictive map 264 or predictive control zone map 265 or other information derived from or based on the predictive map 264, predictive control zone map 265, or both to operator 260. Operator 260 may be a local operator or a remote operator. As an example, controller 231 generates control signals to control a display mechanism to display one or both of predictive map 264 and predictive control zone map 265 for the operator 260. Controller 231 may generate operator actuatable mechanisms that are displayed and can be actuated by the operator to interact with the displayed map. The operator can edit the map based on the operator's observation. Settings controller 232 can generate control signals to control various settings on the agricultural harvester 100 based upon predictive map 264, the predictive control zone map 265, or both. For instance, settings controller 232 can generate control signals to control machine and header actuators 248. In response to the generated control signals, the machine and header actuators 248 operate to control, for example, one or more of the sieve and chaffer settings, thresher clearance, rotor settings, cleaning fan speed settings, header height, header functionality, reel speed, reel position, draper functionality (where agricultural harvester 100 is coupled to a draper header), corn header functionality, internal distribution control and other actuators 248 that affect the other functions of the agricultural harvester 100. Path planning controller 234 illustratively generates control signals to control steering subsystem 252 to steer agricultural harvester 100 according to a desired path. Path planning controller 234 can control a path planning system to generate a route for agricultural harvester 100 and can control propulsion subsystem 250 and steering subsystem 252 to steer agricultural harvester 100 along that route. Feed rate controller 236 can control various subsystems, such as propulsion subsystem 250 and machine actuators 248, to control a feed rate based upon the predictive map 264 or predictive control zone map 265 or both. Header and reel controller 238 can generate control signals to control a header or a reel or other header functionality. Draper belt controller 240 can generate control signals to control a draper belt or other draper functionality based upon the predictive map 264, predictive control zone map 265, or both. Deck plate position controller 242 can generate control signals to control a position of a deck plate included on a header based on predictive map 264 or predictive control zone map 265 or both, and residue system controller 244 can generate control signals to control a residue subsystem 138 based upon predictive map 264 or predictive control zone map 265, or both. Machine cleaning controller 245 can generate control signals to control machine cleaning subsystem 254. Other controllers included on the agricultural harvester 100 can control other subsystems based on the predictive map 264 or predictive control zone map 265 or both as well.

FIGS. 3A and 3B (collectively referred to herein as FIG. 3) show a flow diagram illustrating one example of the operation of agricultural harvester 100 in generating a predictive map 264 and predictive control zone map 265 based upon prior information map 258.

At 280, agricultural harvester 100 receives prior information map 258. Examples of prior information map 258 or receiving prior information map 258 are discussed with respect to blocks 281, 282, 284 and 286. As discussed above, prior information map 258 maps values of a variable, corresponding to a first characteristic, to different locations in the field, as indicated at 12 block 282. As indicated at block 281, receiving the prior information map 258 may involve selecting one or more of a plurality of possible prior information maps that are available. For instance, one prior information map may be a topographical map generated from aerial imagery or a previous operation on the field. Another prior information map may be a map generated during a prior pass through the field which may have been performed by a different machine performing a previous operation in the field, such as a sprayer or other machine. The process by which one or more prior information maps are selected can be manual, semi-automated, or automated. The prior information map 258 is based on data collected prior to a current harvesting operation. This is indicated by block 284. For instance, the data may be collected based on aerial images taken during a previous year, or earlier in the current growing season, or at other times. The data May be based on data detected in ways other than using aerial images. The data for the prior information map 258 can be transmitted to agricultural harvester 100 using communication system 206 and stored in data store 202. The data for the prior information map 258 can be provided to agricultural harvester 100 using communication system 206 in other ways as well, and this is indicated by block 286 in the flow diagram of FIG. 3. In some examples, the prior information map 258 can be received by communication system 206.

Upon commencement of a harvesting operation, in-situ sensors 208 generate sensor signals indicative of one or more in-situ data values indicative of a characteristic, for example, a vertical displacement or acceleration characteristic, as indicated by block 288. Examples of in-situ sensors 222 include, without limitation: current position sensor 300, vertical displacement sensor 301, heading sensor 302, mass sensor 303, speed sensor 304, mass distribution sensor 305, and/or motion sensor 306.

Current position sensor 300 may be a GPS sensor or any other suitable sensor that is able to provide a signal indicative of geographic location.

Vertical displacement sensor 301 includes any sensor that employs technology able to sense changes in vertical displacement of the agricultural machine, or a portion thereof, from the ground. Examples include, without limitation, an ultrasonic sensor directed at the ground to provide an indication of distance to the ground, an inertial measurement units configured to generate a signal indicative of acceleration in the vertical direction, and a laser displacement sensor. Another example of a vertical height sensor is a physical body, such as a header height 11 canes operably coupled to a potentiometer.

Heading sensor 302 can be any suitable device that provides an electronic indication of compass heading. In one example, heading sensor 302 is simply an electronic compass module.

Mass sensor 303 can be a load cell located within the agricultural machine that is able to sense to load (e.g., mass of harvested material) and provide a signal indicative of the load. Additionally, the mass sensor 303 can include software or logic that calculates an amount of harvested material as a function of operating time of the harvester. In another example, mass sensor can include one or more cameras within the harvester that obtains one or more images of the harvested material within the harvester.

Speed sensor 304 can be a known speed sensor operably coupled to a mechanical element of the agricultural machine in order to provide a signal indicative of speed. Additionally, or alternatively, speed sensor 304 could be a logic module or code that processes repeated indications of current position, from current position sensor 300 to determine speed. Another example of a speed sensor includes a ground radar system.

Mass distribution sensor 305 can be a plurality of load cells such that differences in signals between the plurality of load cells may indicate distribution of the load within the agricultural machine. Similarly, one or more cameras may also show the harvested material within the harvester where the image provides an indication of distribution. In embodiments where multiple cameras are employed, stereovision processing techniques can be employed to detect a 3-dimensional representation of the harvested material within the harvester, which 3-dimensional representation can show areas of more or less material within the harvester and thus indicate mass distribution.

Motion sensor 306 can include any suitable sensor that provides information related to motion of the agricultural machine or portions thereof. For example, motion sensor 306 could include one or more inertial measurement units.

As explained above, the in-situ sensors 222 include other types of in-situ sensors, designated by in-situ sensors 226. In some examples, data from on-board sensors is georeferenced using position, heading, or speed data from geographic position sensor 204.

Predictive model generator 210 controls the prior information variable-to-in-situ variable model generator 228 to generate a model that models a relationship between the mapped values contained in the prior information map 258 and the in-situ values sensed by the in-situ sensors 208 as indicated by block 292. The characteristics or data types represented by the mapped values in the prior information map 258 and the in-situ values sensed by the in-situ sensors 208 may be the same characteristics or data type or different characteristics or data types.

The relationship or model generated by predictive model generator 210 is provided to predictive map generator 212. Predictive map generator 212 generates a predictive map 264 that predicts a value of the characteristic sensed by the in-situ sensors 208 at different geographic locations in a field being harvested, or a different characteristic that is related to the characteristic sensed by the in-situ sensors 208, using the predictive model and the prior information map 258, as indicated by block 294.

It should be noted that, in some examples, the prior information map 258 may include two or more different maps or two or more different map layers of a single map. Each map layer may represent a different data type from the data type of another map layer or the map layers may have the same data type that were obtained at different times. For example, a first map may provide geo-referenced soil profile roughness relative to a first direction, and a second map may provide geo-referenced soil profile roughness relative to a second direction, which may be perpendicular to the first direction. Further, each map in the two or more different maps or each layer in the two or more different map layers of a map maps a different type of variable to the geographic locations in the field. In such an example, predictive model generator 210 generates a predictive model that models the relationship between the in-situ data and each of the different variables mapped by the two or more different maps or the two or more different map layers. Similarly, the in-situ sensors 208 can include two or more sensors each sensing a different type of variable. Thus, the predictive model generator 210 generates a predictive model that models the relationships between each type of variable mapped by the prior information map 258 and each type of variable sensed by the in-situ sensors 208. In one example, predictive model generator may model machine dynamic response based on input variable including, without limitation, terrain variability; machine velocity; machine mass; distribution of machine mass; soil profile roughness; and direction of travel. Predictive map generator 212 can generate a functional predictive map 263 that predicts a value for each sensed characteristic sensed by the in-situ sensors (or a characteristic related to the sensed characteristic) at different locations in the field being harvested using the predictive model and each of the maps or map layers in the prior information map 258.

Predictive map generator 212 configures the predictive map 264 so that the predictive map 264 is actionable (or consumable) by control system 214. Predictive map generator can provide the predictive map 264 to the control system 214 or to control zone generator 213 or both. Some examples of different ways in which the predictive map 264 can be configured or output are described with respect to blocks 296, 295, 299 and 297. For instance, predictive map generator 212 configures predictive map 264 so that predictive map 264 includes values that can be read by control system 214 and used as the basis for generating control signals for one or more of the different controllable subsystems of the agricultural harvester 100, as indicated by block 296.

Control zone generator 213 can divide the predictive map 264 into control zones based on the values on the predictive map 264. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 214, the controllable subsystems 216, based on wear considerations, or on other criteria as indicated by block 295. Predictive map generator 212 configures predictive map 264 for presentation to an operator or other user. Control zone generator can configure predictive control zone map 265 for presentation to an operator or other user. This is indicated by block 299. When presented to an operator or other user, the presentation of the predictive map 264 or predictive control zone map 265 or both may contain one or more of the predictive values on the predictive map 264 correlated to geographic location, the control zones on predictive control zone map 265 correlated to geographic location, and settings values or control parameters that are used based on the predicted values on map 264 or zones on predictive control zone map 265. The presentation can, in another example, include more abstracted information or more detailed information. The presentation can also include a confidence level that indicates an accuracy with which the predictive values on predictive map 264 or the zones on predictive control zone map 265 conform to measured values that may be measured by sensors on agricultural harvester 100 as agricultural harvester 100 moves through the field. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of machine 100 may be unable to see the information corresponding to the predictive map 264 or make any changes to machine operation. A supervisor, such as a supervisor at a remote location, however, may be able to see the predictive map 264 on the display but be prevented from making any changes. A manager, who may be at a separate remote location, may be able to see all of the elements on predictive map 264 and also be able to change the predictive map 264. In some instances, the predictive map 264 accessible and changeable by a manager located remotely may be used in machine control. This is one example of an authorization hierarchy that may be implemented. The predictive map 264 or predictive control zone map 265 or both can be configured in other ways as well, as indicated by block 297.

At block 298, input from geographic position sensor 204 and other in-situ sensors 208 are received by the control system. Particularly, at block 300, control system 214 detects an input from the geographic position sensor 204 identifying a geographic location of agricultural harvester 100. Block 302 represents receipt by the control system 214 of sensor inputs indicative of trajectory or heading of agricultural harvester 100, and block 304 represents receipt by the control system 214 of a speed of agricultural harvester 100. Block 307 represents receipt by the control system 214 of other information from various in-situ sensors 208.

At block 308, control system 214 generates control signals to control the controllable subsystems 216 based on the predictive map 264 or predictive control zone map 265 or both and the input from the geographic position sensor 204 and any other in-situ sensors 208. At block 310, control system 214 applies the control signals to the controllable subsystems. It will be appreciated that the particular control signals that are generated, and the particular controllable subsystems 216 that are controlled, may vary based upon one or more different things. For example, the control signals that are generated and the controllable subsystems 216 that are controlled may be based on the type of predictive map 264 or predictive control zone map 265 or both that is being used. Similarly, the control signals that are generated and the controllable subsystems 216 that are controlled and the timing of the control signals can be based on various latencies of crop flow through the agricultural harvester 100 and the responsiveness of the controllable subsystems 216.

By way of example, a generated predictive map 264 in the form of a predictive terrain feature map can be used to control one or more subsystems 216. For instance, the predictive terrain feature map can include soil profile roughness values georeferenced to locations within the field being harvested. The soil profile roughness values from the predictive terrain feature map can be extracted and used to control the propulsion, active suspension subsystem, and active seat suspension subsystems 250, 253, and 254, respectively. By controlling subsystems 250, 253, and 254, a speed of agricultural harvester 100 over ground as well as dynamic response of suspension and/or the seat can be controlled. Consequently, a wide variety of other control signals can be generated using values obtained from a predictive dynamic response map or other type of predictive map to control one or more of the controllable subsystems 216. The control signals can be provided to an active suspension system of the vehicle 253 (shown in FIG. 2), provided to a propulsion system 250 of the agricultural machine (e.g., to slow down), and/or to an active seat suspension system 254.

At block 312, a determination is made as to whether the harvesting operation has been completed. If harvesting is not completed, the processing advances to block 314 where in-situ sensor data from geographic position sensor 204 and in-situ sensors 208 (and perhaps other sensors) continue to be read.

In some examples, at block 316, agricultural harvester 100 can also detect learning trigger criteria to perform machine learning on one or more of the predictive map 264, predictive control zone map 265, the model generated by predictive model generator 210, the zones generated by control zone generator 213, one or more control algorithms implemented by the controllers in the control system 214, and other triggered learning.

The learning trigger criteria can include any of a wide variety of different criteria. Some examples of detecting trigger criteria are discussed with respect to blocks 318, 320, 321, 322 and 324. For instance, in some examples, triggered learning can involve recreation of a relationship used to generate a predictive model when a threshold amount of in-situ sensor data are obtained from in-situ sensors 208. In such examples, receipt of an amount of in-situ sensor data from the in-situ sensors 208 that exceeds a threshold triggers or causes the predictive model generator 210 to generate a new predictive model that is used by predictive map generator 212. Thus, as agricultural harvester 100 continues a harvesting operation, receipt of the threshold amount of in-situ sensor data from the in-situ sensors 208 triggers the creation of a new relationship represented by a predictive model generated by predictive model generator 210. Further, new predictive map 264, predictive control zone map 265, or both can be regenerated using the new predictive model. Block 318 represents detecting a threshold amount of in-situ sensor data used to trigger creation of a new predictive model.

In other examples, the learning trigger criteria may be based on how much the in-situ sensor data from the in-situ sensors 208 are changing, such as over time or compared to previous values. For example, if variations within the in-situ sensor data (or the relationship between the in-situ sensor data and the information in prior information map 258) are within a selected range or is less than a defined amount, or below a threshold value, then a new predictive model is not generated by the predictive model generator 210. As a result, the predictive map generator 212 does not generate a new predictive map 264, predictive control zone map 265, or both. However, if variations within the in-situ sensor data are outside of the selected range, are greater than the defined amount, or are above the threshold value, for example, then the predictive model generator 210 generates a new predictive model using all or a portion of the newly received in-situ sensor data that the predictive map generator 212 uses to generate a new predictive map 264. At block 320, variations in the in-situ sensor data, such as a magnitude of an amount by which the data exceeds the selected range or a magnitude of the variation of the relationship between the in-situ sensor data and the information in the prior information map 258, can be used as a trigger to cause generation of a new predictive model and predictive map. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 210 switches to a different prior information map (different from the originally selected prior information map 258), then switching to the different prior information map may trigger relearning by predictive model generator 210, predictive map generator 212, control zone generator 213, control system 214, or other items. In another example, transitioning of agricultural harvester 100 to a different topography or to a different control zone may be used as learning trigger criteria as well.

In some instances, operator 260 can also edit the predictive map 264 or predictive control zone map 265 or both. The edits can change a value on the predictive map 264, change a size, shape, position, or existence of a control zone on predictive control zone map 265, or both. Block 321 shows that edited information can be used as learning trigger criteria.

In some instances, it may also be that operator 260 observes that automated control of a controllable subsystem, is not what the operator desires. In such instances, the operator 260 may provide a manual adjustment to the controllable subsystem reflecting that the operator 260 desires the controllable subsystem to operate in a different way than is being commanded by control system 214. Thus, manual alteration of a setting by the operator 260 can cause one or more of predictive model generator 210 to relearn a model, predictive map generator 212 to regenerate map 264, control zone generator 213 to regenerate one or more control zones on predictive control zone map 265, and control system 214 to relearn a control algorithm or to perform machine learning on one or more of the controller components 232 through 246 in control system 214 based upon the adjustment by the operator 260, as shown in block 322. Block 324 represents the use of other triggered learning criteria.

In other examples, relearning may be performed periodically or intermittently based, for example, upon a selected time interval such as a discrete time interval or a variable time interval, as indicated by block 326.

If relearning is triggered, whether based upon learning trigger criteria or based upon passage of a time interval, as indicated by block 326, then one or more of the predictive model generator 210, predictive map generator 212, control zone generator 213, and control system 214 performs machine learning to generate a new predictive model, a new predictive map, a new control zone, and a new control algorithm, respectively, based upon the learning trigger criteria. The new predictive model, the new predictive map, and the new control algorithm are generated using any additional data that has been collected since the last learning operation was performed. Performing relearning is indicated by block 328.

If the harvesting operation has been completed, operation moves from block 312 to block 330 where one or more of the predictive map 264, predictive control zone map 265, and predictive model generated by predictive model generator 210 are stored. The predictive map 264, 11 predictive control zone map 265, and predictive model may be stored locally on data store 202 or sent to a remote system using communication system 206 for later use.

It will be noted that while some examples herein describe predictive model generator 210 and predictive map generator 212 receiving a prior information map in generating a predictive model and a functional predictive map, respectively. In other examples, the predictive model generator 210 and predictive map generator 212 can receive other types of maps, including predictive maps, such as a functional predictive map generated during the harvesting operation.

FIG. 4 is a block diagram of a portion of the agricultural harvester 100 shown in FIG. 1. Particularly, FIG. 4 shows, among other things, examples of the predictive model generator 210 and the predictive map generator 212 in more detail. FIG. 4 also illustrates information flow among the various components shown. The predictive model generator 210 receives a terrain feature map 332 as a prior information map. Terrain feature map can include any suitable terrain information such as soil profile roughness, ground type (e.g., pavement, gravel, black dirt, clay, sand, crop, waterway, etc.), ground height, that is referenced to geographical location. Predictive model generator 210 also receives a geographic location 334, or an indication of a geographic location, from geographic position sensor 204. In-situ sensors 208 illustratively include vehicle speed sensor, a vehicle direction sensor, a vehicle motion sensor 336, such as a vertical displacement sensor and/or IMU, a mass sensor, and/or a mass distribution sensor, as well as a processing system 338. As used herein, an in-situ sensor is any sensor located on the agricultural machine, an implement towed thereby, or a seat of the agricultural machine. The processing system 338 processes sensor data 340 generated from in-situ sensors 208, such as on-board vehicle motion sensor 336, to generate processed data, some examples of which are described below. These in-situ sensors 208 or combinations thereof, provide sensor data 340 that is indicative of a dynamic response of the agricultural machine to the surface over which it travels. For example, if the agricultural machine encounters uneven terrain and experiences a vertical movement, such as a bounce, the vertical displacement is sensed by a vertical displacement sensor. Similarly, if the terrain causes a towed implement to generate a surge or drag, an IMU on the implement or the towing machine will provide a signal indicative of the surge/drag.

In some examples, vehicle motion sensor 336 may be a multi-axis inertial measurement unit (IMU) that provides as indication of acceleration and/or displacement in at least two orthogonal axes. However, vehicle motion sensor 336 can also include a vertical displacement sensor.

The present discussion proceeds with respect to an example in which onboard sensor 336 is a multi-axis IMU.

It will be appreciated that this is just one example, and the sensors mentioned above are contemplated herein as well. As shown in FIG. 4, the example predictive model generator 210 includes one or more of a vehicle response-to-terrain feature model generator 342, seat response-to-terrain feature model generator 344, and an implement response-to-terrain feature model generator 346. In other examples, the predictive model generator 210 may include additional, fewer, or different components than those shown in the example of FIG. 4. Consequently, in some examples, the predictive model generator 210 may include other items 348 as well, which may include other types of predictive model generators to generate other types of models.

Model generator 342 identifies a relationship between measured vehicle dynamic response (e.g., vehicle vertical displacement or acceleration, pitching and/or rolling, etc.) to terrain at a geographic location of the feature map 332 at the same location in the field where the vehicle dynamic response was detected. Based on this relationship established by model generator 342, model generator 342 generates a predictive response model. The predictive response model is used by vehicle response map generator 352 to predict vehicle dynamic response at different locations in the field based upon the georeferenced terrain feature value(s) contained in the terrain feature map 332 at the same locations in the field.

Model generator 344 identifies a relationship between operator seat response, at a geographic location corresponding to terrain features from the terrain feature map 332 at the same geographic location where the seat dynamic response was detected. Again, terrain feature value is the georeferenced value contained in the terrain feature map 332. Model generator 344 then generates a predictive seat response model that is used by seat response map generator 354 to predict the seat response at a location in the field based upon the terrain feature value for that location in the field.

Model generator 346 identifies a relationship between the implement dynamic response at a particular location in the field and the terrain feature map 332 at that same location. Model generator 346 generates a predictive implement response model that is used by implement response map generator 356 to predict the implement response at a particular location in the field based upon the terrain feature value(s) at that location in the field.

In light of the above, the predictive model generator 210 is operable to produce a plurality of predictive dynamic response models, such as one or more of the predictive dynamic response models generated by model generators 342, 344 and 346. In another example, two or more of the predictive response models described above may be combined into a single predictive response model that predicts two or more of vehicle dynamic response, seat response, and implement dynamic response based upon the terrain feature values at different locations in the field. Any of these models, or combinations thereof, are represented collectively by response model 350 in FIG. 4.

The predictive response model 350 is provided to predictive map generator 212. In the example of FIG. 4, predictive map generator 212 includes a vehicle response map generator 352, a seat response map generator 354, and an implement response map generator 356. In other examples, the predictive map generator 212 may include additional, fewer, or different map generators. Thus, in some examples, the predictive map generator 212 may include other items 358 which may include other types of map generators to generate response maps for other types of characteristics. Vehicle response map generator 352 receives the predictive response model 350, which predicts vehicle dynamic response based upon a terrain feature value along with the terrain feature map 332 and generates a predictive map that predicts the vehicle dynamic response at different locations in the field.

Seat response map generator 354 generates a predictive seat response map that predicts seat response at different locations in the field based upon the terrain feature values at those locations in the field and the predictive response model 350. Implement response map generator 356 illustratively generates a predictive implement response map that predicts implement responses at different locations in the field based upon the terrain feature values at those locations in the field and the predictive response model 350.

Predictive map generator 212 outputs one or more predictive maps 360 that are predictive of one or more of vehicle dynamic response, seat response, and implement response. Each of the predictive maps 360 predicts the respective response characteristic at different locations in a field. Each of the generated predictive maps 360 may be provided to control zone generator 213, control system 214, or both. Control zone generator 213 generates control zones and incorporates those control zones into the functional predictive map, i.e., predictive map 360, to produce predictive control zone map 265. One or both of predictive map 264 and predictive 13 control zone map 265 may be provided to control system 214, which generates control signals to control one or more of the controllable subsystems 216 based upon the predictive map 264, predictive control zone map 265, or both.

One of the main components of the response of a mechanical system, such as an agricultural harvester, to a mechanical input, such as driving over a bump, is the mass of the mechanical system. In various agricultural operations, the mass and/or distribution of mass can change significantly over the course of the agricultural operation. For example, as a harvester harvests a crop, the mass of the harvested crop within the harvester increases the total mass of the harvester and affects the dynamic response of the harvester. Further, if a harvester is full and offloads its material, the changed mass will generate a significant difference in machine dynamics. For example, an end turn executed before the harvester offloads its material (i.e., full) will have a different dynamic response than after the harvester offloads its material (i.e., empty). Conversely, as a sprayer sprays its liquid over a field, the mass of the sprayer will decrease, which also affects the dynamic response of the system. At least some embodiments described herein, account for this changing mass and/or mass distribution relative to the agricultural machine and/or implement as the agricultural machine performs its function. The change in mass and/or mass distribution of the agricultural machine can be addressed in various ways. In one way, if the machine mass deviates from an initial machine mass, by a set threshold, a learning criteria trigger, such as that described in FIG. 3B can be generated. In another example, the model itself can receive mass and/or mass distribution information, such that the mass and/or mass distribution is provided as an input, among various other inputs, to the model generator(s).

Terrain features can change depending on the type of terrain and the event or condition that affects the terrain. For example, a gravel road will be affected by heavy rains more than a paved road. Additionally, asphalt may be affected by freeze/thaw cycles or may buckle under high temperature. Over the course of a winter, rougher areas of a road or surface may get worse due to effects of snow plowing. Further, in a field at harvest time, a number of trucks or machines passing over the surface can affect the surface.

FIG. 5 is a flow diagram of a method of generating and utilizing a confidence metric relative to a predictive dynamic response model for an agricultural machine. Method 400 begins at block 402 where an initial terrain feature map is generated. This may be done in any suitable manner. In one example, the map can simply be a terrain or topographical map of the area. In another example, the prior information map can be generated from a collection of in-situ sensor information or a historical response from previous travel over the area. Once the map is generated, control passes to block 404 where an initial confidence value is set. This may be a confidence value for the entire map, it may be a confidence value for positions within the map, or a combination thereof. In one example, the confidence metric is simply a value ranging between 0 and 1.0 that is initially set to 1. However, any suitable initial confidence metric can be set. The important feature is that upon the creation of the map, the confidence in the newly created map is very high.

At block 406, it is determined whether any events that may reduce the confidence have occurred since the last time the confidence level was used. Such events include, without limitation, the passage of time 408. For example, for a surface such as a gravel road, the passage of time, such as a year, can have a significant impact on the surface quality. Another event that can affect the confidence is the number of times the surface has been travelled over. This is illustrated in FIG. 5 as passes 410. These passes may be counted by the agricultural machine itself and reported to a centralized tracking facility or simply stored in the memory of the agricultural machine. Additionally, passes of other machines, such as agricultural machines, or road transport machines, such as semi-tractor trailers can be counted and reported to the centralized facility. In this way, the utilization of the surface (e.g., field, trail, or roadway) can be weighed against the surface type to determine degradation of the confidence metric. Another event that can affect the confidence metric is weather 412. For example, periods of rain can significantly affect a field. Thus, at block 406, method 400 identifies weather event that have occurred since the last utilization of the confidence metric at the geographic location of the agricultural machine. If significant weather events have occurred, the confidence metric will be reduced. Next, at block 414, method 400 determines the degree of confidence metric degradation based on one or more of the events listed above. This computation may be performed by a controller or processor of the agricultural device. Additionally, or alternatively, this computation could be performed by a remote device and communicated to the agricultural machine. Upon completion of block 414, the degraded confidence metric is generated or otherwise obtained.

At block 416, the degraded confidence metric is compared with a threshold to determine whether the degraded confidence metric is below a threshold. This threshold can be a pre-defined threshold set by the manufacturer of the agricultural machine, a user-selectable threshold, or any other suitable threshold. If the metric is below the threshold, then control passes to block 418, where the predictive map may be regenerated or the model relearned. Additionally, or alternatively, the degraded confidence metric may be used with a suitable adjustment to one or more control outputs. For example, the adjusted control output may slow the agricultural machine when the confidence metric is below the threshold. Further, a second, lower, threshold could be used at which, method 400 would simply stop the agricultural machine. Returning to block 416, if the degraded confidence metric is not below the threshold, control passes to block 422 where the predictive dynamic response map is used normally, without any confidence-based adjustments to control output(s).

It can thus be seen that the present system takes a prior information map that maps a characteristic such as a terrain feature value or information from a prior operation pass to different locations. The present system also uses one or more in-situ sensors that sense in-situ sensor data that is indicative of a characteristic, such as a vehicle dynamic response and generates a model that models a relationship between the characteristic sensed using the in-situ sensor, or a related characteristic, and the characteristic mapped in the prior information map. Thus, the present system generates a functional predictive map using a model, in-situ data, and a prior information map and may configure the generated functional predictive map for consumption by a control system, for presentation to a local or remote operator or other user, or both. For example, the control system may use the map to control one or more systems of a combine harvester.

The present discussion has mentioned processors and servers. In some examples, the processors and servers include computer processors with associated memory and timing circuitry, not separately shown. The processors and servers are functional parts of the systems or devices to which the processors and servers belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, the user actuatable operator interface mechanisms can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, and interactions. It will be appreciated that any or all of such systems, components, logic and interactions may be implemented by hardware items, such as processors, memory, or other processing components, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that May be used to implement any or all of the systems, components, logic and interactions described above. Other structures may be used as well.

Figure 6:
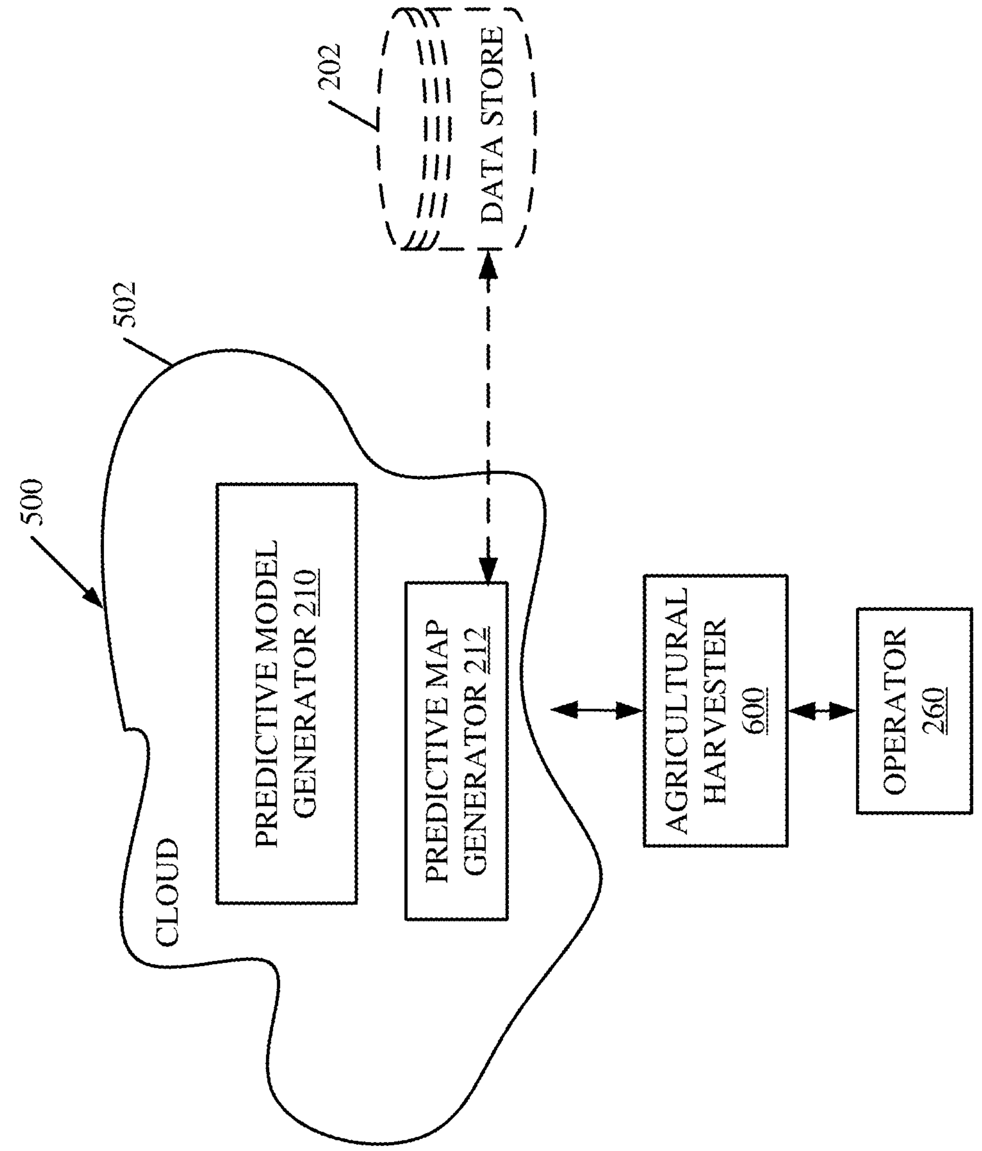
FIG. 6 is a block diagram showing one example of an agricultural harvester in communication with a remote server environment.

FIG. 6 is a block diagram of agricultural harvester 600, which may be similar to agricultural harvester 100 shown in FIG. 2. The agricultural harvester 600 communicates with elements in a remote server architecture 500. In some examples, remote server architecture 500 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 6, some items are similar to those shown in FIG. 2 and those items are similarly numbered. FIG. 6 specifically shows that predictive model generator 210 or predictive map generator 212, or both, may be located at a server location 502 that is remote from the agricultural harvester 600. Therefore, in the example shown in FIG. 6, agricultural harvester 600 accesses systems through remote server location 502.

FIG. 6 also depicts another example of a remote server architecture. FIG. 6 shows that some elements of FIG. 2 may be disposed at a remote server location 502 while others may be located elsewhere. By way of example, data store 202 may be disposed at a location separate from location 502 and accessed via the remote server at location 502. Regardless of where the elements are located, the elements can be accessed directly by agricultural harvester 600 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated, or manual information collection system. As the combine harvester 600 comes close to the machine containing the information collection system, such as a fuel truck prior to fueling, the information collection system collects the information from the combine harvester 600 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the agricultural harvester 600 until the agricultural harvester 600 enters an area having wireless communication coverage. The agricultural harvester 600, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 500 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 7:
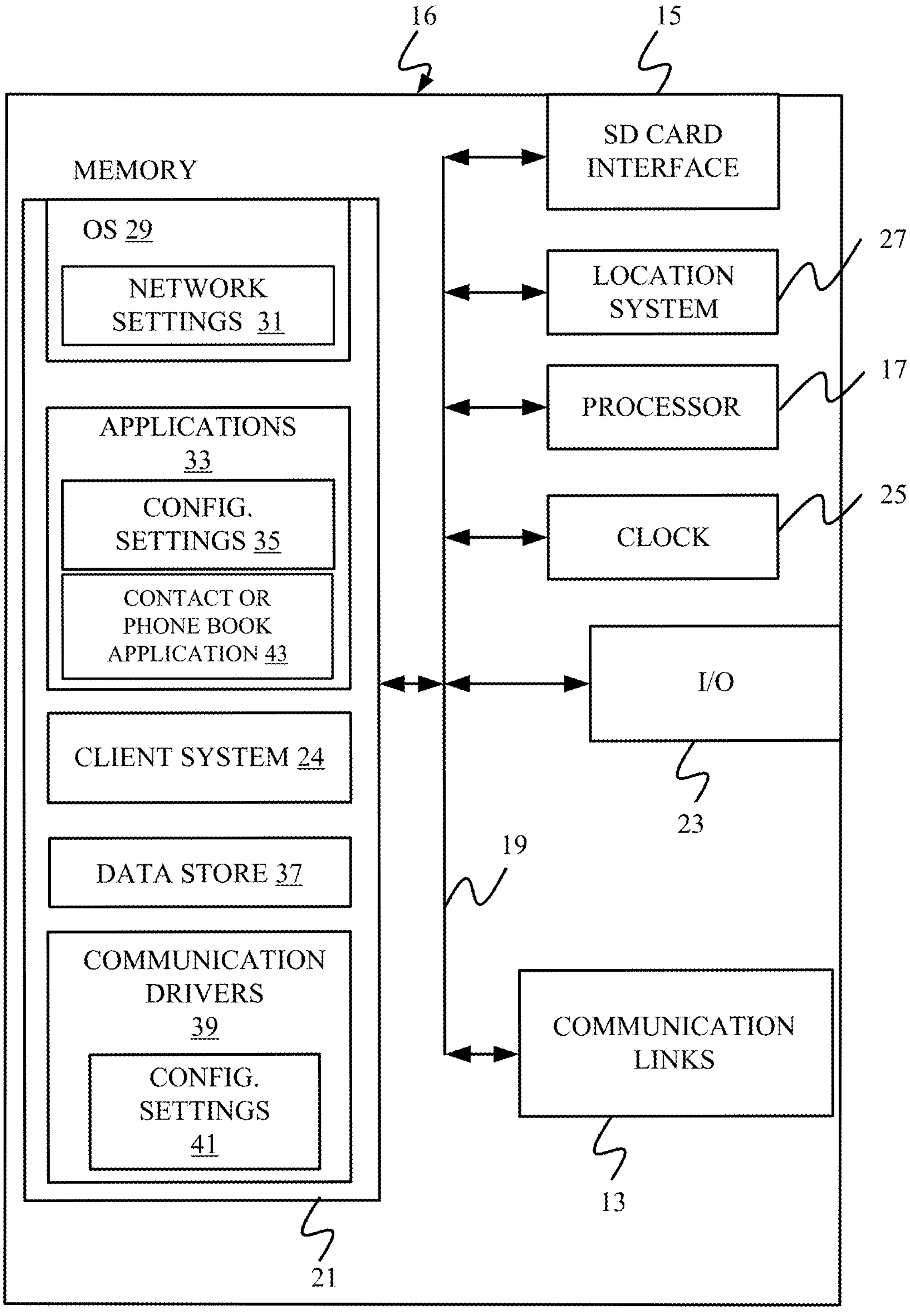
FIGS. 7-9 show examples of mobile devices that can be used in an agricultural harvester.
Figure 8:
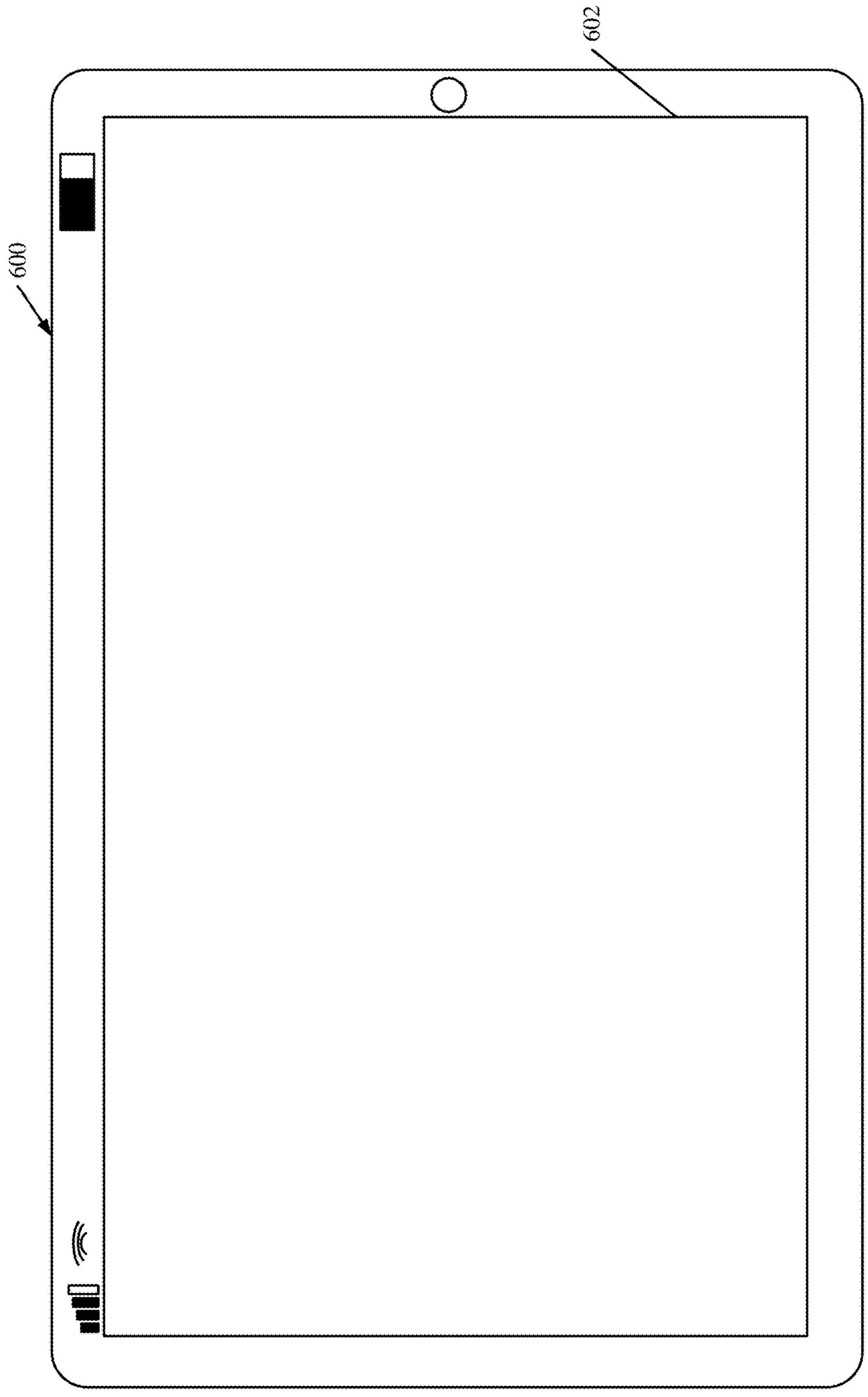
Figure 9:
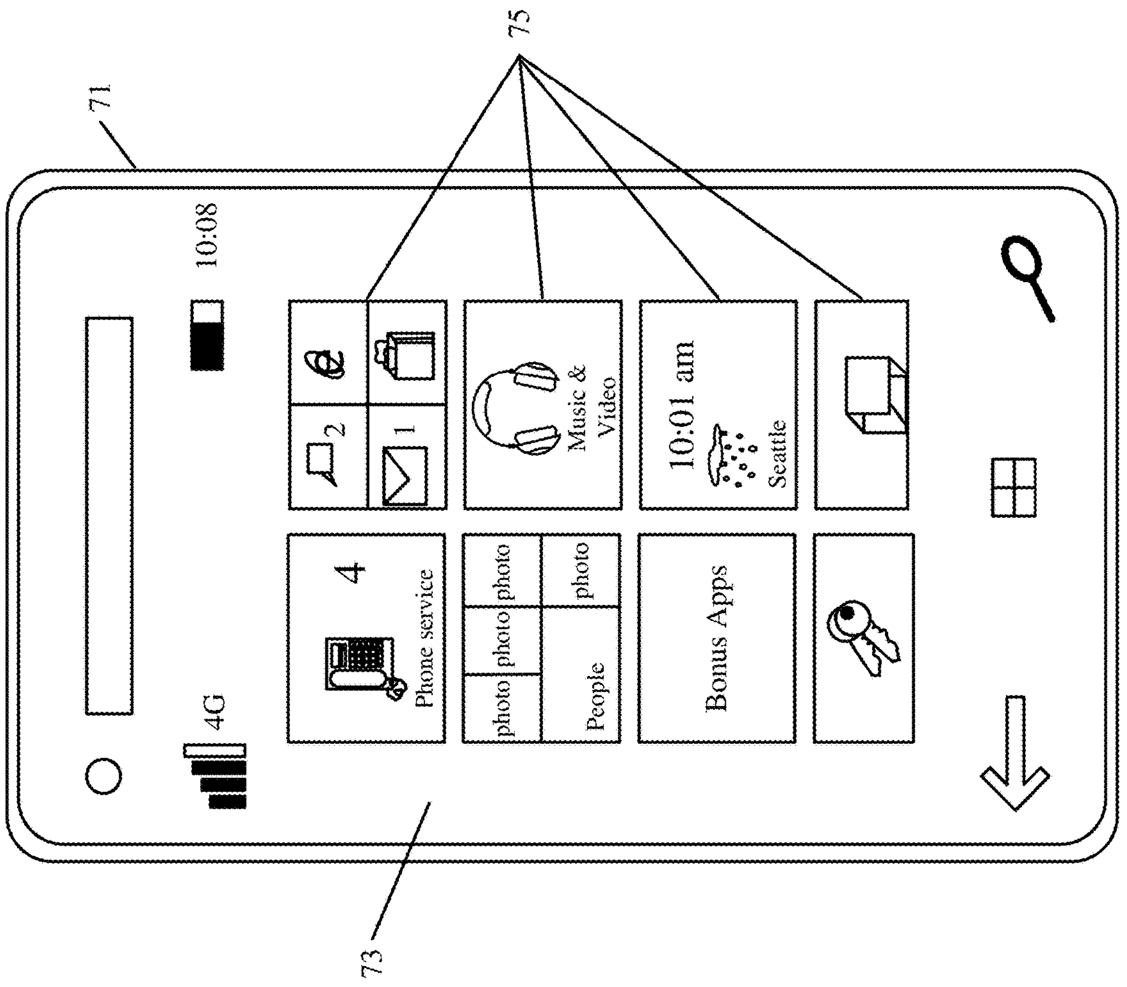

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use in generating, processing, or displaying the maps discussed above. FIGS. 8-9 are examples of handheld or mobile devices.

FIG. 7 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. Tablet computer 600 may also use an on-screen virtual keyboard. Of course, computer 600 might also be attached to a keyboard or other user input device through a suitable attachment mechanism, such as a wireless link or USB port, for instance. Computer 600 may also illustratively receive voice inputs as well.

FIG. 9 is similar to FIG. 8 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
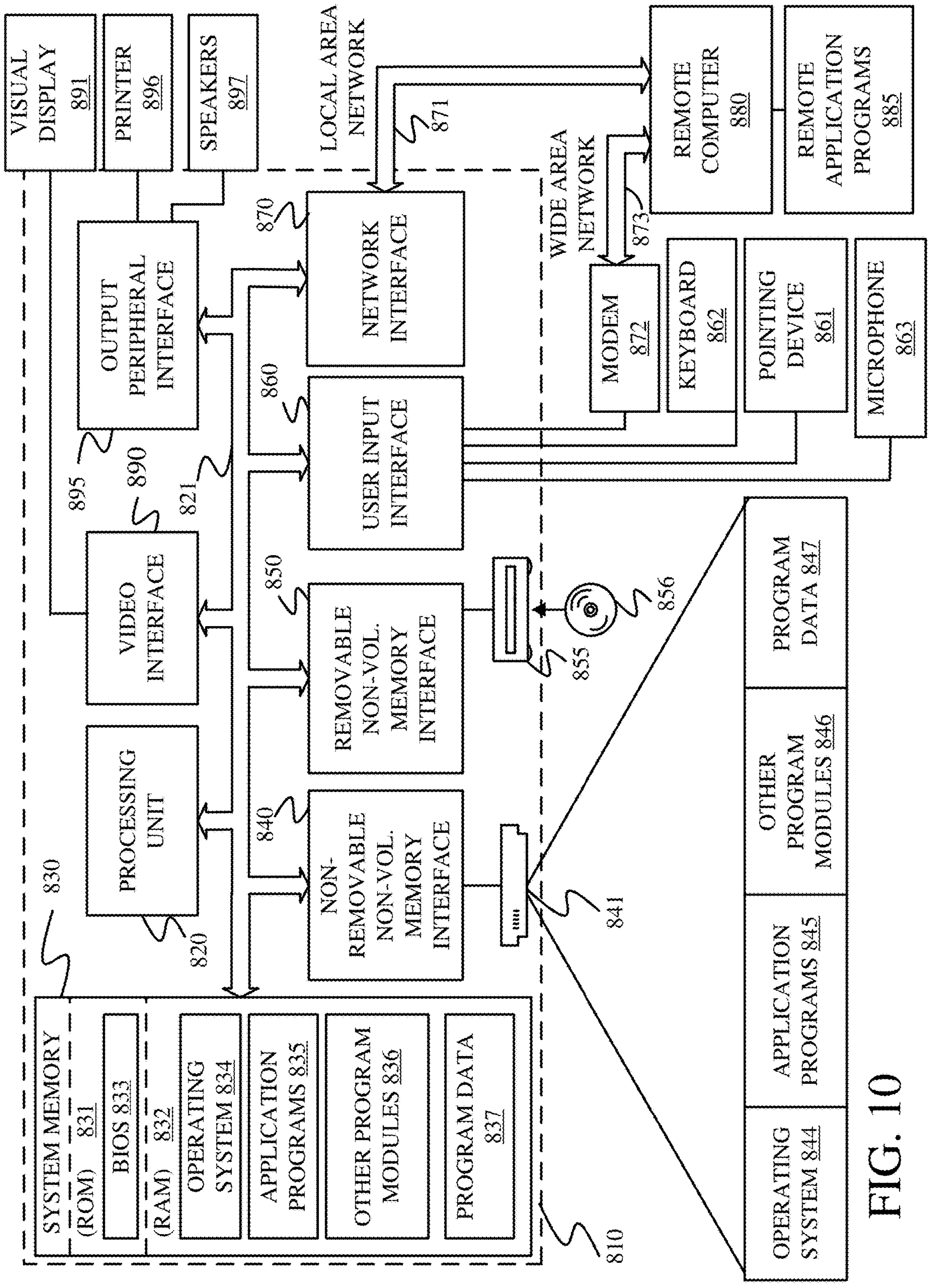
FIG. 10 is a block diagram showing one example of a computing environment that can be used in an agricultural harvester and the architectures illustrated in previous figures.

FIG. 10 is one example of a computing environment in which elements of FIG. 2 can be deployed. With reference to FIG. 10, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 10.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts 11 of one or more other examples. All of this is contemplated herein.

Example 1 is an agricultural work machine, comprising: a communication system that receives a prior information map that includes values of a terrain feature characteristic corresponding to different geographic locations; a geographic position sensor that detects a geographic location of the agricultural work machine; an in-situ sensor that detects a value of a dynamic response characteristic of the agricultural work machine corresponding to the geographic location; a predictive model generator that generates a predictive model that models a relationship between the terrain feature characteristic and the dynamic response characteristic based on the value of the terrain feature characteristic in the prior information map at the geographic location and a value of the dynamic response characteristic sensed by the in-situ sensor at the geographic location; and a predictive map generator that generates a functional predictive dynamic response map, that maps predictive values of the dynamic response characteristic to the different geographic locations, based on the values of the terrain feature characteristic in the prior information map and based on the predictive model.

Example 2 is the agricultural work machine of any or all of the previous examples, wherein the predictive map generator configures the functional predictive dynamic response map for consumption by a control system that generates control signals to control a controllable subsystem on the agricultural work machine based on the functional predictive dynamic response map.

Example 3 is the agricultural work machine of any or all of the previous examples, wherein the controllable subsystem is selected from the group consisting of: a vehicle propulsion subsystem, an active suspension system, and an active seat subsystem.

Example 4 is the agricultural work machine of any or all of the previous examples, wherein the agricultural work machine has a mass characteristic that changes as the agricultural work machine operates, and the agricultural work machine further comprises a mass-related sensor that detects a mass-related value related to at least one of a mass of the agricultural work machine and a mass of an implement towed by the agricultural work machine, and wherein the predictive map generator is further configured to generate the functional predictive map based, in part, on the mass-related value.

Example 5 is the agricultural work machine of any or all of the previous examples, wherein the mass-related sensor is a sensor selected from the group consisting of: a load cell; and a camera disposed to provide an image of an amount of material housed within at least one of the agricultural work machine and an implement towed by the agricultural work machine to provide an indication of mass of the at least one agricultural work machine and implement that changes during operation of the agricultural work machine.

Example 6 is the agricultural work machine of any or all of the previous examples, wherein the mass sensor comprises logic configured to compute mass based on operation of the agricultural work machine.

Example 7 is the agricultural work machine of any or all of the previous examples, wherein the logic computes mass based on operating time.

Example 8 is the agricultural work machine of any or all of the previous examples, wherein the logic computes mass based on distance travelled.

Example 9 is the agricultural work machine of any or all of the previous examples, wherein the mass-related sensor is selected from the group consisting of: a plurality of load cells disposed to provide an indication related to mass distribution, and a plurality of cameras disposed to provide images of an amount of material housed within at least one of the agricultural work machine and an implement towed by the agricultural work machine that changes during operation of the agricultural work machine, the images being indicative of mass distribution of the material.

Example 10 is the agricultural work machine of any or all of the previous examples, wherein the prior information map comprises a terrain map that maps terrain at different geographic locations, and wherein the predictive model generator is configured to identify a relationship between the terrain and the dynamic response characteristic sensed at the geographic location and the terrain feature value, in the terrain feature map, at the geographic location, the predictive model being configured to receive a geographic location as a model input and generate the dynamic response characteristic as a predictive model generator output based on the identified relationship.

Example 11 is the agricultural work machine of any or all of the previous examples, wherein the predictive dynamic response characteristic is selected from the group consisting of: a predictive vehicle dynamic response characteristic, an implement dynamic response characteristic, and a seat dynamic response characteristic.

Example 12 is the agricultural work machine of any or all of the previous examples, wherein the in-situ sensor is selected from the group consisting of: a motion sensor, a vertical displacement sensor, and an inertial measurement unit (IMU).

Example 13 is a computer implemented method of generating a functional predictive dynamic response map, comprising: receiving a prior information map, at an agricultural work machine, that indicates values of a terrain feature characteristic corresponding to different geographic locations; detecting a geographic location of the agricultural work machine; detecting, with an in-situ sensor, a value of a dynamic response of the agricultural machine corresponding to the geographic location; generating a predictive model that models a relationship between the terrain feature characteristic and the dynamic response; and controlling a predictive map generator to generate the functional predictive dynamic response map, that maps predictive values of the dynamic response to the different locations based on the values of the terrain feature in the prior information map and the predictive model.

Example 14 is the computer implemented method of any or all of the previous examples, and further comprising configuring the functional predictive dynamic response map for a control system that generates control signals to control a controllable subsystem on the agricultural work machine based on the functional predictive dynamic response map.

Example 15 is the computer implemented method of any or all of the previous examples, wherein the controllable subsystem is selected from the group consisting of: a vehicle propulsion subsystem an active suspension system, and an active seat subsystem.

Example 16 is the computer implemented method of any or all of the previous examples, wherein the prior information map includes soil surface roughness.

Example 17 is the computer implemented method of any or all of the previous examples, wherein the prior information map includes road characteristics.

Example 18 is a method of operating an agricultural work machine. The method includes obtaining a terrain feature map having a confidence level, determining whether one or more events have occurred that degrade confidence the confidence level, calculating a degraded confidence level based on the one or more events, comparing the degraded confidence level to a threshold, and selectively performing an action based on the comparison of the degraded confidence level to the threshold.

Example 19 is the method of any or all of the previous examples, wherein selectively performing an action includes an action selected from the group consisting of: triggering model relearning if the confidence level is below the threshold, adjusting a control output to a controllable subsystem of the agricultural machine, and proceeding with a non-adjusted control output to a controllable subsystem.

Example 20 is the method of any or all of the previous examples, wherein the one or more events includes an event selected from the group consisting of: passage of time, a number of passes of the agricultural machine over a given geographical location, and a weather event.

Although the subject matter has been described in language specific to structural features or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:

an in-situ sensor that detects a value of a dynamic response characteristic of an agricultural work machine corresponding to a first geographic location, of a plurality of different geographic locations, in a field;

one or more processors; and memory storing instructions, executable by the one or more processors, that, when executed by the one or more processors, configure the one or more processors to:

obtain an information map that includes values of an agricultural characteristic corresponding to the plurality of different geographic locations in the field;

identify a predictive value of the dynamic response characteristic corresponding to a second geographic location in the field based on the value of the dynamic response characteristic, detected by the in-situ sensor, corresponding to the first geographic location in the field and a value of the agricultural characteristic, in the information map, corresponding to the first geographic location; and control the agricultural work machine based on the predictive value of the dynamic response characteristic corresponding to the second geographic location in the field.

2. The agricultural system of claim 1, wherein the instructions, when executed by the one or more processors, further configure the one or more processors to:

identify a relationship between the dynamic response characteristic and the agricultural characteristic based on the value of the dynamic response characteristic, detected by the in-situ sensor, corresponding to the first geographic location in the field and the value of the agricultural characteristic, in the information map, corresponding to the first geographic location in the field; and identify the predictive value of the dynamic response characteristic corresponding to the second geographic location in the field based on the relationship between the dynamic response characteristic and the agricultural characteristic.

3. The agricultural system of claim 2, wherein the instructions, when executed by the one or more processors, further configure the one or more processors to:

identify a value of the agricultural characteristic, in the information map, corresponding to the second geographic location in the field; and identify the predictive value of the dynamic response characteristic corresponding to the second geographic location in the field based on the relationship between the dynamic response characteristic and the agricultural characteristic and the value of the agricultural characteristic, in the information map, corresponding to the second geographic location in the field.

4. The agricultural system of claim 3, wherein the instructions, when executed by the one or more processors, further configure the one or more processors to:

generate a functional predictive machine dynamic response map that maps the predictive value of the dynamic response characteristic to the second geographic location.

5. The agricultural system of claim 1, wherein the information map includes, as the values of the agricultural characteristic corresponding to the plurality of different geographic locations in the field, values of a terrain feature characteristic corresponding to the plurality of different geographic locations in the field.

6. The agricultural system of claim 5, wherein the terrain feature characteristic comprises one of soil roughness, ground type, or ground height.

7. The agricultural system of claim 1, wherein the dynamic response characteristic comprises operator seat response.

8. The agricultural system of claim 1, wherein the instructions, when executed by the one or more processors, further configure the one or more processors to control the agricultural work machine based on the predictive value of the dynamic response characteristic corresponding to the second geographic location in the field by controlling one or more of:

a propulsion subsystem of the agricultural work machine;

a steering subsystem of the agricultural work machine;

an active suspension subsystem of the agricultural work machine; or an active seat subsystem of the agricultural work machine.

9. A computer implemented method comprising:

detecting, with an in-situ sensor, a value of a dynamic response characteristic of an agricultural work machine corresponding to a first geographic location, of a plurality of different geographic locations, in a field;

obtaining an information map that includes values of an agricultural characteristic corresponding to the plurality of different geographic locations in the field;

identifying a predictive value of the dynamic response characteristic corresponding to a second geographic location in the field based on the value of the dynamic response characteristic, detected by the in-situ sensor, corresponding to the first geographic location in the field and a value of the agricultural characteristic, in the information map, corresponding to the first geographic location; and controlling the agricultural work machine based on the predictive value of the dynamic response characteristic corresponding to the second geographic location in the field.

10. The computer implemented method of claim 9 and further comprising identifying a relationship between the dynamic response characteristic and the agricultural characteristic based on the value of the dynamic response characteristic, detected by the in-situ sensor, corresponding to the first geographic location in the field and the value of the agricultural characteristic, in the information map, corresponding to the first geographic location in the field, wherein identifying the predictive value of the dynamic response characteristic comprises:

identifying the predictive value of the dynamic response characteristic corresponding to the second geographic location in the field based on the relationship between the dynamic response characteristic and the agricultural characteristic.

11. The computer implemented method of claim 10 and further comprising identifying a value of the agricultural characteristic, in the information map, corresponding to the second geographic location, wherein identifying the predictive value of the dynamic response characteristic comprises:

identifying the predictive value of the dynamic response characteristic corresponding to the second geographic location in the field based on the relationship between the dynamic response characteristic and the agricultural characteristic and the value of the agricultural characteristic, in the information map, corresponding to the second geographic location in the field.

12. The computer implemented method of claim 11 and further comprising generating a functional predictive machine dynamic response map that maps the predictive value of the dynamic response characteristic to the second geographic location.

13. The computer implemented method of claim 9, wherein obtaining the information map comprises obtaining a terrain feature map that includes, as the values of the agricultural characteristic corresponding to the plurality of different geographic locations in the field, values of a terrain feature characteristic corresponding to the plurality of different geographic locations in the field.

14. The computer implemented method of claim 9, wherein detecting, with the in-situ sensor, the value of the dynamic response characteristic of the agricultural work machine corresponding to the first geographic location comprises detecting, with the in-situ sensor, a value of an operator seat response corresponding to the first geographic location;

wherein identifying the predictive value of the dynamic response characteristic corresponding to the second geographic location in the field comprises identifying the predictive value of the operator seat response corresponding to the second geographic location in the field.

15. The computer implemented method of claim 9, wherein controlling the agricultural work machine comprises one or more of:

controlling a propulsion subsystem of the agricultural work machine;

controlling a steering subsystem of the agricultural work machine;

controlling an active suspension subsystem of the agricultural work machine; or controlling an active seat subsystem of the agricultural work machine.

16. An agricultural work machine comprising:

an in-situ sensor that detects a value of a dynamic response characteristic of the agricultural work machine corresponding to a first geographic location; of a plurality of different geographic locations, in a field;

one or more processors; and memory storing instructions, executable by the one or more processors, that, when executed by the one or more processors, configure the one or more processors to:

obtain an information map that includes values of an agricultural characteristic corresponding to the plurality of different geographic locations in the field;

identify a predictive value of the dynamic response characteristic corresponding to a second geographic location in the field based on the value of the dynamic response characteristic, detected by the in-situ sensor, corresponding to the first geographic location in the field and a value of the agricultural characteristic, in the information map, corresponding to the first geographic location; and control the agricultural work machine based on the predictive value of the dynamic response characteristic corresponding to the second geographic location in the field.

17. The agricultural work machine of claim 16, wherein the instructions, when executed by the one or more processors, further configure the one or more processors to:

identify a relationship between the dynamic response characteristic and the agricultural characteristic based on the value of the dynamic response characteristic, detected by the in-situ sensor, corresponding to the first geographic location in the field and the value of the agricultural characteristic, in the information map, corresponding to the first geographic location in the field; and identify the predictive value of the dynamic response characteristic corresponding to the second geographic location in the field based on the relationship between the dynamic response characteristic and the agricultural characteristic.

18. The agricultural work machine of claim 17, wherein the instructions, when executed by the one or more processors, further configure the one or more processors to:

identify a value of the agricultural characteristic, in the information map, corresponding to the second geographic location in the field;

identify the predictive value of the dynamic response characteristic corresponding to the second geographic location in the field based on the relationship between the dynamic response characteristic and the agricultural characteristic and the value of the agricultural characteristic, in the information map, corresponding to the second geographic location in the field; and generate a functional predictive machine dynamic response map that maps the predictive value of the dynamic response characteristic to the second geographic location.

19. The agricultural work machine of claim 16, wherein the agricultural characteristic comprises one of soil roughness, ground type, or ground height, and wherein the dynamic response characteristic comprises operator seat response.

20. The agricultural work machine of claim 16, wherein the instructions, when executed by the one or more processors, further configure the one or more processors to control the agricultural work machine based on the predictive value of the dynamic response characteristic corresponding to the second geographic location in the field by controlling one or more of:

a propulsion subsystem of the agricultural work machine;

a steering subsystem of the agricultural work machine;

an active suspension subsystem of the agricultural work machine; or an active seat subsystem of the agricultural work machine.

* * * * *